May 27, 1952 H. C. UHLIG Re. 23,509

METHOD OF AND APPARATUS FOR TWISTING YARN

Original Filed Aug. 1, 1947 10 Sheets-Sheet 1

INVENTOR
Henry C. Uhlig
BY
Alfred W. Vibber
ATTORNEY

METHOD OF AND APPARATUS FOR TWISTING YARN

Original Filed Aug. 1, 1947 10 Sheets-Sheet 2

INVENTOR
Henry C. Uhlig
BY
Alfred W. Dibber
ATTORNEY

May 27, 1952

H. C. UHLIG

Re. 23,509

METHOD OF AND APPARATUS FOR TWISTING YARN

Original Filed Aug. 1, 1947

10 Sheets-Sheet 3

INVENTOR
Henry C. Uhlig
BY
Alfred W. Vibber
ATTORNEY

METHOD OF AND APPARATUS FOR TWISTING YARN

Original Filed Aug. 1, 1947 10 Sheets-Sheet 4

INVENTOR
Henry C. Uhlig
BY
Alfred W. Vibber
ATTORNEY

METHOD OF AND APPARATUS FOR TWISTING YARN

Original Filed Aug. 1, 1947 10 Sheets-Sheet 5

INVENTOR
Henry C. Uhlig
BY
Alfred W. Vibber
ATTORNEY

METHOD OF AND APPARATUS FOR TWISTING YARN

Original Filed Aug. 1, 1947 10 Sheets-Sheet 6

INVENTOR
Henry C. Uhlig
BY
Alfred W. Dibber
ATTORNEY

METHOD OF AND APPARATUS FOR TWISTING YARN
Original Filed Aug. 1, 1947 10 Sheets-Sheet 7
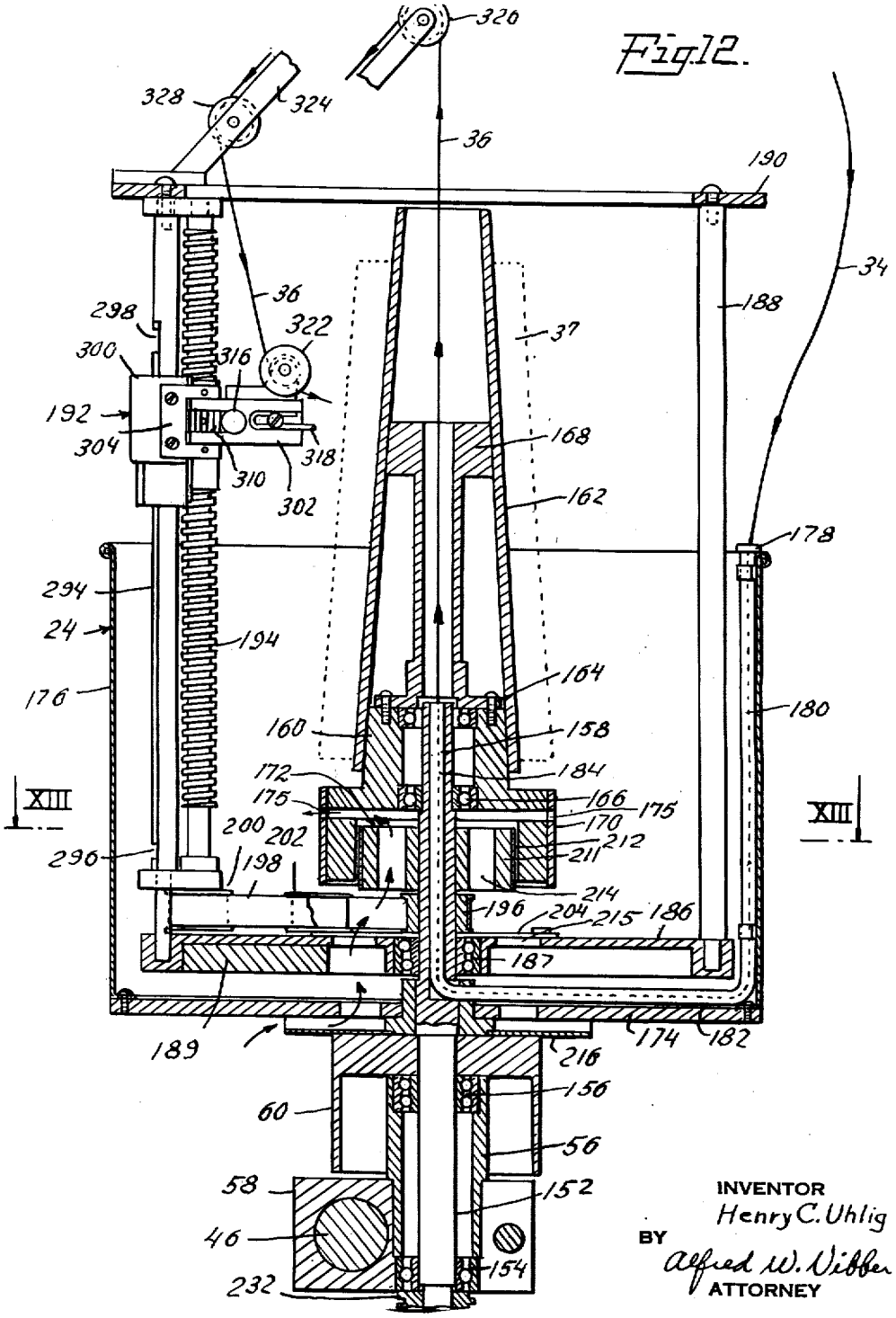
INVENTOR
Henry C. Uhlig
BY
Alfred W. Dibber
ATTORNEY METHOD OF AND APPARATUS FOR TWISTING YARN
Original Filed Aug. 1, 1947 10 Sheets-Sheet 8
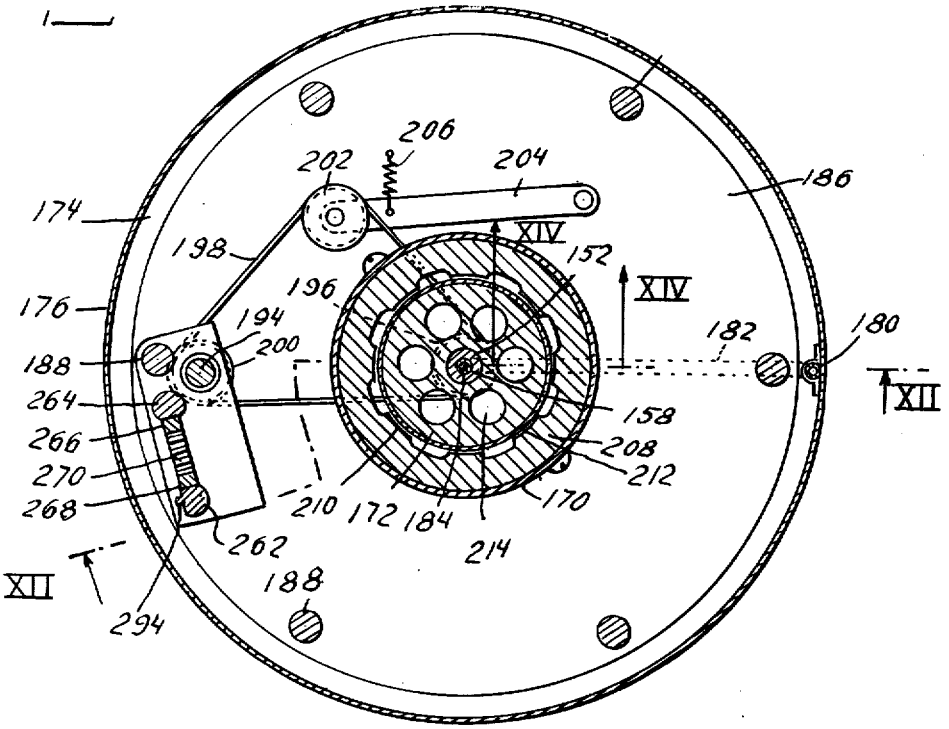
Fig. 14.
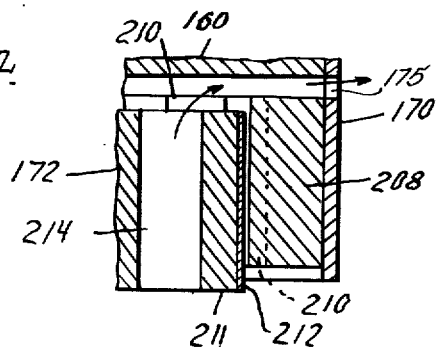
INVENTOR
Henry C. Uhlig
BY
Alfred W. Dibber
ATTORNEY

METHOD OF AND APPARATUS FOR TWISTING YARN

Original Filed Aug. 1, 1947 10 Sheets-Sheet 9

INVENTOR
Henry C. Uhlig
BY
Alfred W. Nibber
ATTORNEY

METHOD OF AND APPARATUS FOR TWISTING YARN

Original Filed Aug. 1, 1947 10 Sheets-Sheet 10

INVENTOR
Henry C. Uhlig
BY
Alfred W. Dibber
ATTORNEY

Reissued May 27, 1952

Re. 23,509

UNITED STATES PATENT OFFICE 23,509

METHOD OF AND APPARATUS FOR TWISTING YARN

Henry C. Uhlig, Clifton, N. J., assignor, by mesne assignments, to Howe Twister Corporation, Jersey City, N. J., a corporation of New Jersey Original No. 2,487,837, dated November 15, 1949, Serial No. 765,577, August 1, 1947. Application for reissue November 7, 1950, Serial No. 194,550

39 Claims. (Cl. 57—58)

Matter enclosed in heavy brackets [ ] appears in the original patent but forms no part of this reissue specification; matter printed in italics indicates the additions made by reissue.

This invention relates to a method of and an apparatus for twisting yarn. More particularly the invention relates to the twisting of yarn into threads and the cabling of such threads into a cabled or stranded cord.

The invention has among its objects, the provision of an improved method for twisting yarn which makes possible, in one operation involving but one unreeling step and one reeling-up step, the twisting of a plurality of the yarns to threads and the cabling of such threads to cords.

Another object of the invention lies in the provision of a relatively simple apparatus, which is flexible in its operation, for carrying out such method.

A further object of the invention resides in the provision, in such apparatus, of an improved reeling device for cabling the threads, such device including means for imposing a predetermined tension on the threads being cabled.

Yet another object of the invention resides in the provision in such apparatus, of an improved thread feeding means for receiving the separate twisted threads and forwarding them to the cabling reel.

A still further object of the invention lies in the provision, in the reeling device, of an improved loading or cable laying finger and of a novel traverse mechanism therefor.

These and further objects of the invention will be more readily apparent in the following description of preferred embodiments of the method and apparatus of the invention.

There is a wide-spread need in industry for the cabling of threads. Among the most common uses for such cabled threads may be cited their employment as reinforcing cords in automobile tires and in V belts. It is most usual at present to employ for such cause the various synthetics, such as rayon and nylon, because of their strength, and their heat and flexure resistance. Both of such materials are formed as fine fibers extruded from spinnerets, a plurality of such fibers being wound in the form of a flat ribbon or yarn to form a "cake." It is with the forming of cords from such yarns with which the present invention is primarily concerned, although it is to be understood that the method and the apparatus of the invention may be used to advantage in forming cords from other fine fiber threads and also from fine wire. The words "yarn," "thread," and "cord" as used in the present specification and claims are therefore to be broadly construed to include such materials, although the invention will be particularly described in connection with the twisting of rayon yarn to form cords.

In practicing prior art methods for performing such yarn twisting operation, it has been necessary, first, to form a plurality of separate threads by twisting the yarns usually all in one direction, the resulting threads being reeled upon a separate bobbin for each thread. Such threads were then, in a separate, subsequent, operation, fed from such bobbins and twisted together, usually in a direction opposite to the direction of twist of the individual threads. There were thus necessary two separate and distinct operations, each of which involved feeding from bobbins, twisting (more properly cabling in the second operation), and reeling the resultant twisted product on a bobbin. Such prior method was unduly time consuming, and in effect required a duplication of at least some of the elements of the apparatus, in carrying out the two twisting steps of the method.

The method and apparatus of the present invention make possible the production of cabled or stranded cord from yarn in one continuous operation. Generally, the method involves feeding two or more yarns from separate supply bobbins, the bobbins being mounted on twisting spindles preferably of such character as to impart a double twist to the yarn and thus to form a thread. Each such thread so formed is then fed continuously to a cabling reel, being combined in their travel thereto, so that the cord laid upon the bobbin in the cabling reel unit is composed of two or more twisted threads cabled together. The invention will be more readily understood by a consideration of the drawings appended hereto in which:

Figure 1:
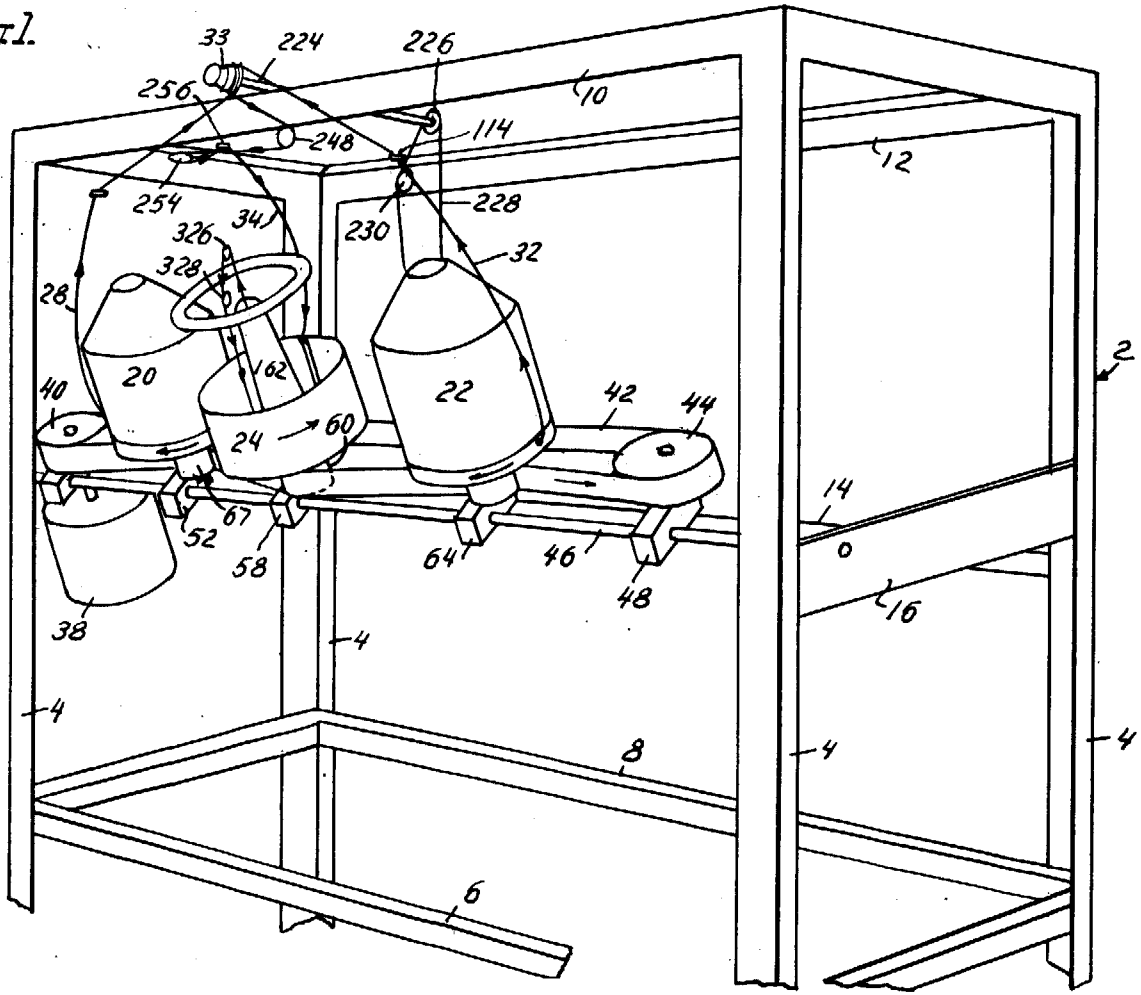
Figure 1 is a view in perspective of a preferred embodiment of the yarn twisting machine of the invention.
Figure 2:
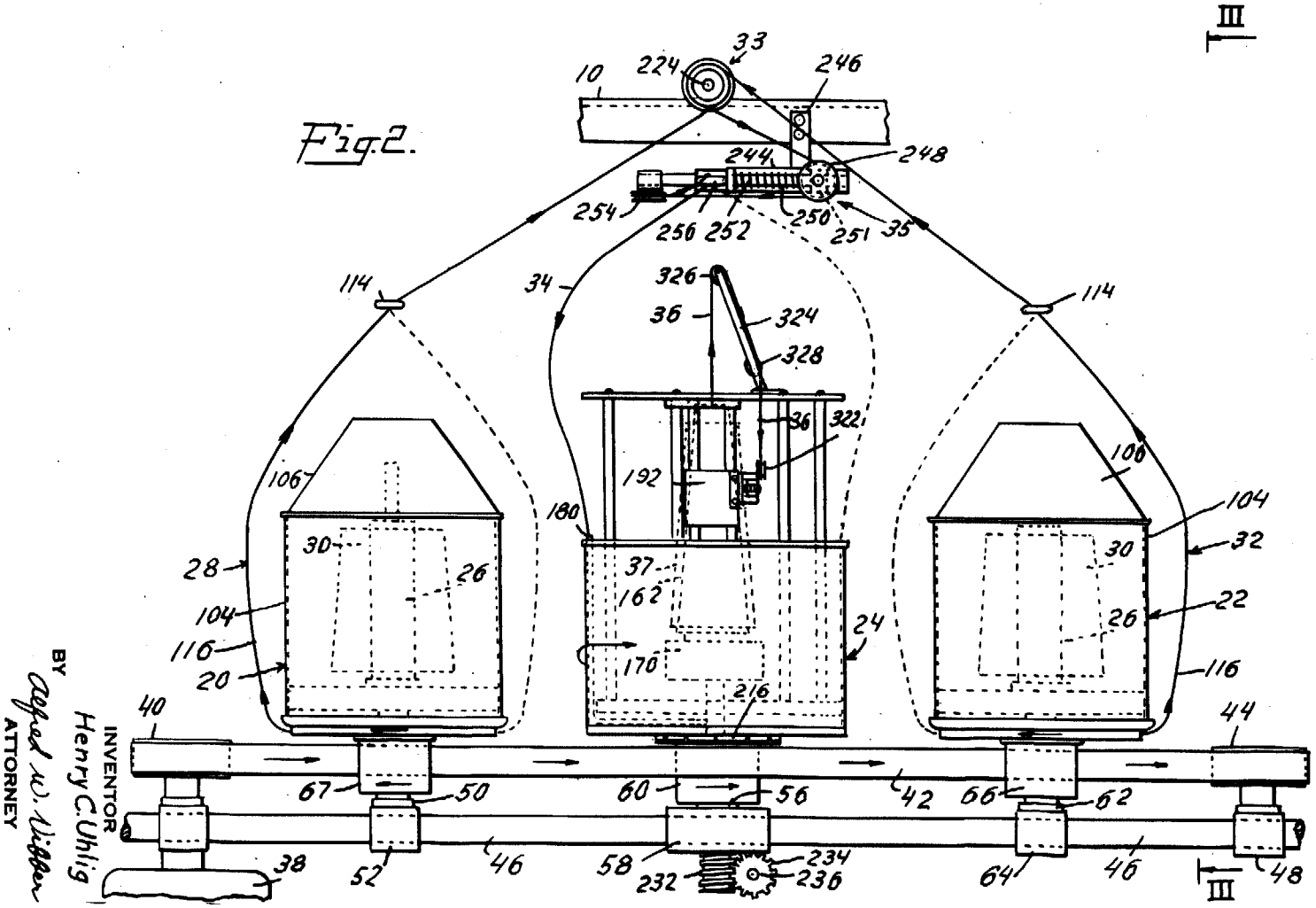
Figure 2 is a view in front elevation of such machine, the view being taken from a plane parallel to that containing the axes of the yarn supplying bobbins.
Figure 3:
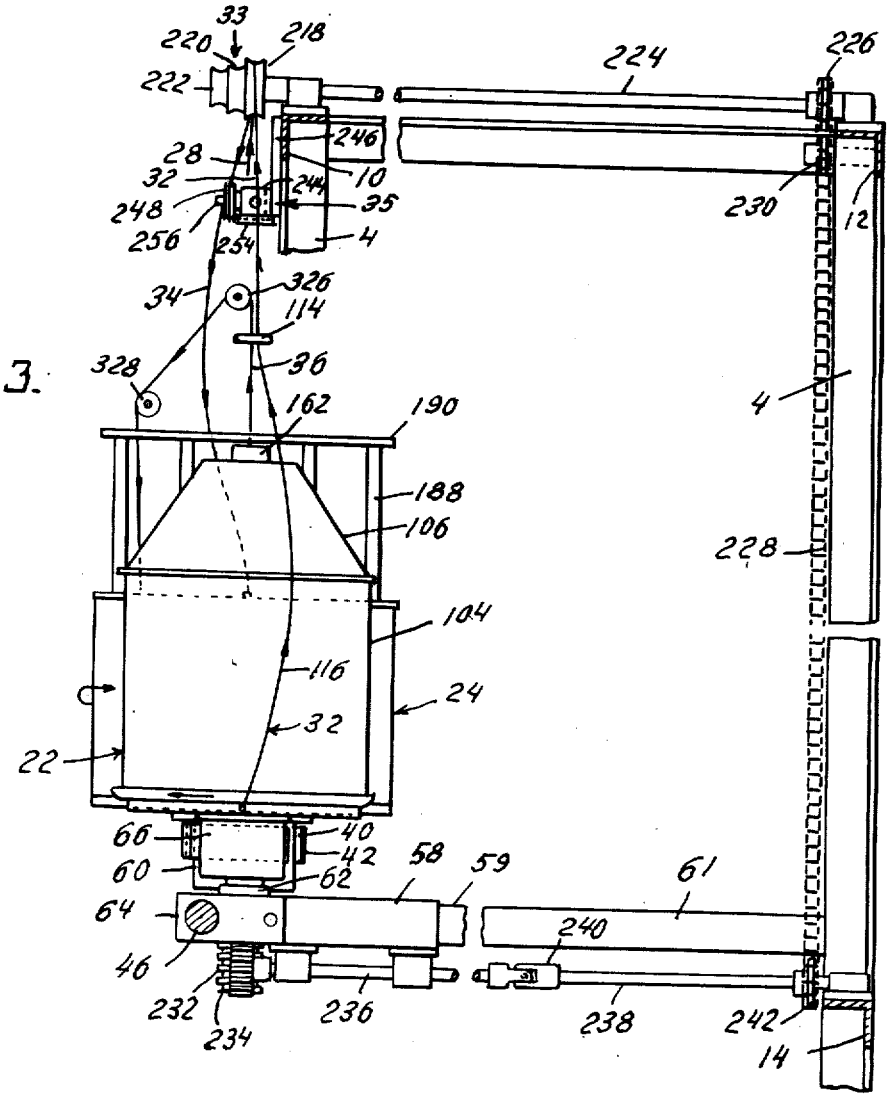
Figure 4:
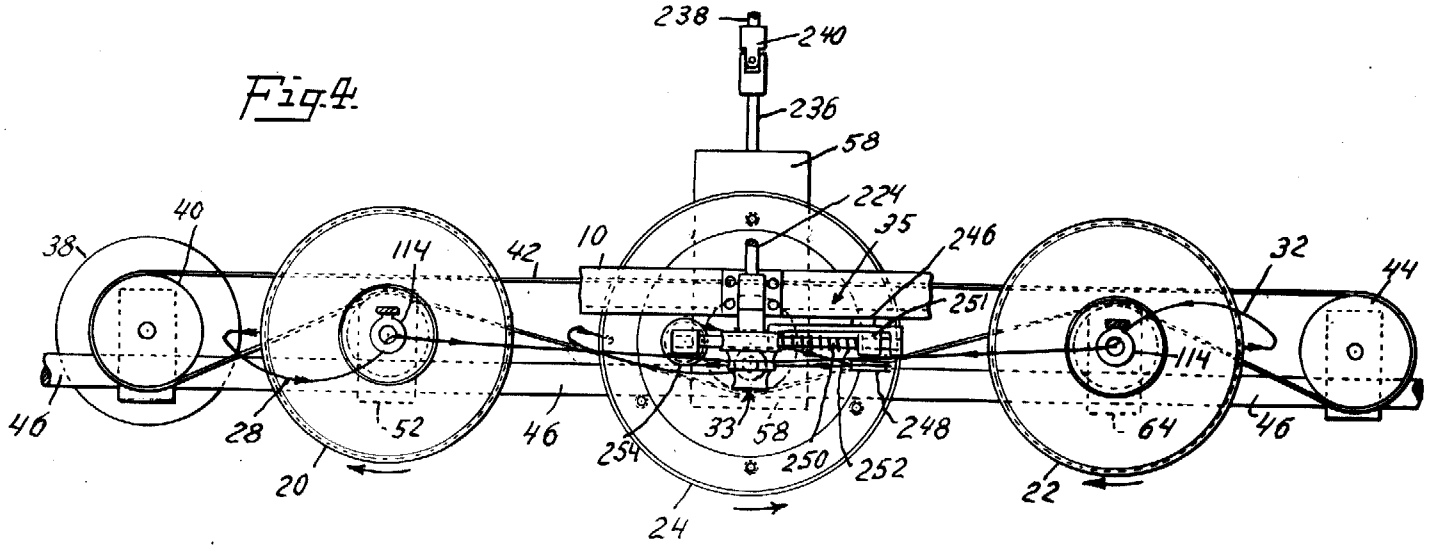
Figure 5:
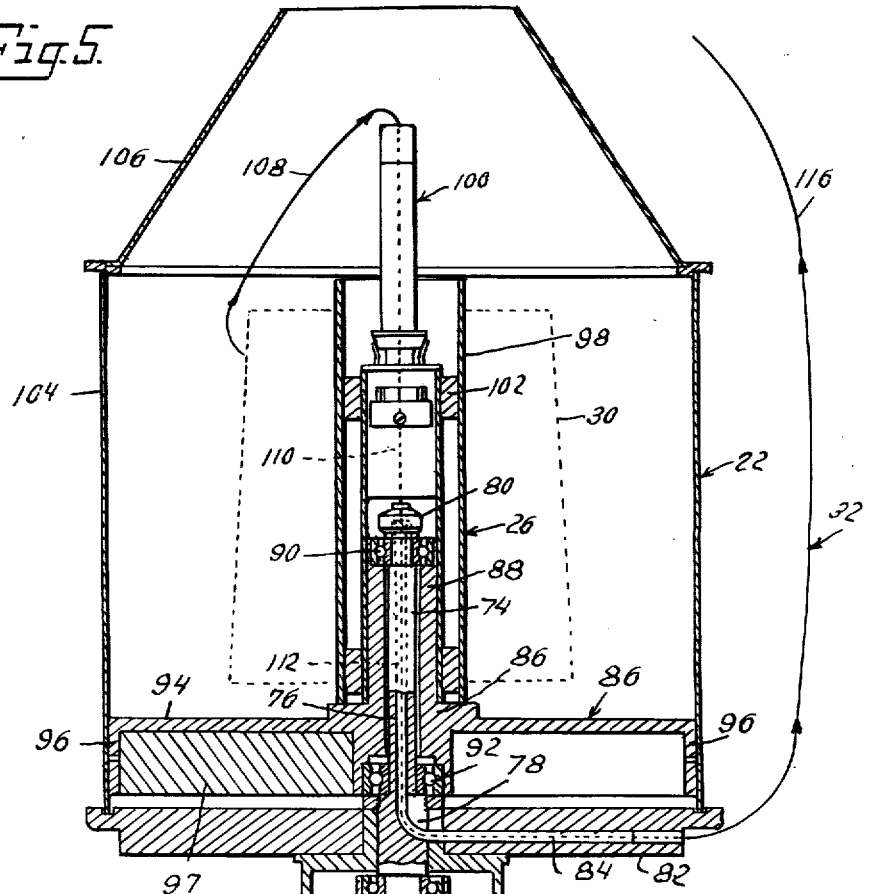
Figure 6:
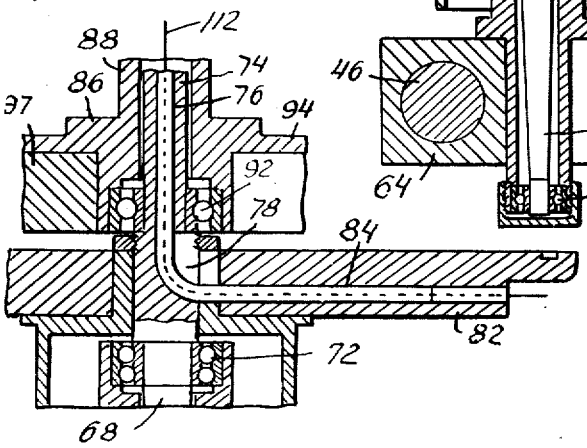
Figure 7:
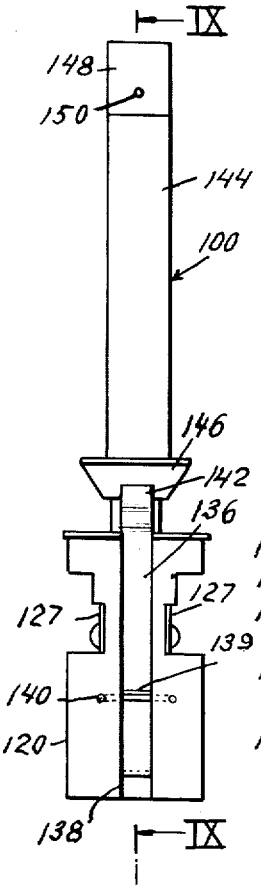
Figure 8:
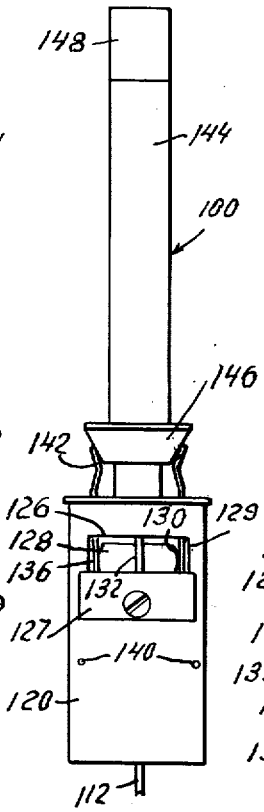
Figure 9:
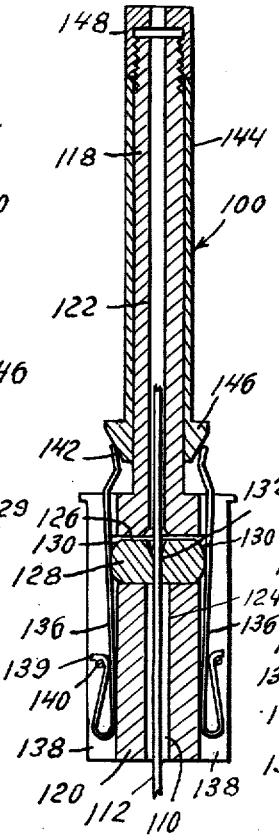
Figure 10:
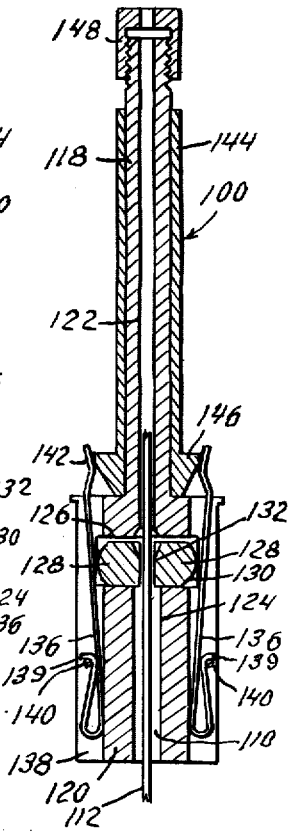
Figure 11:
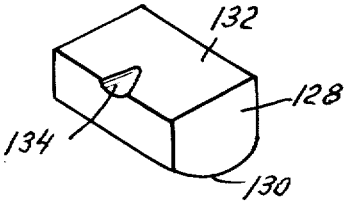
Figure 15:
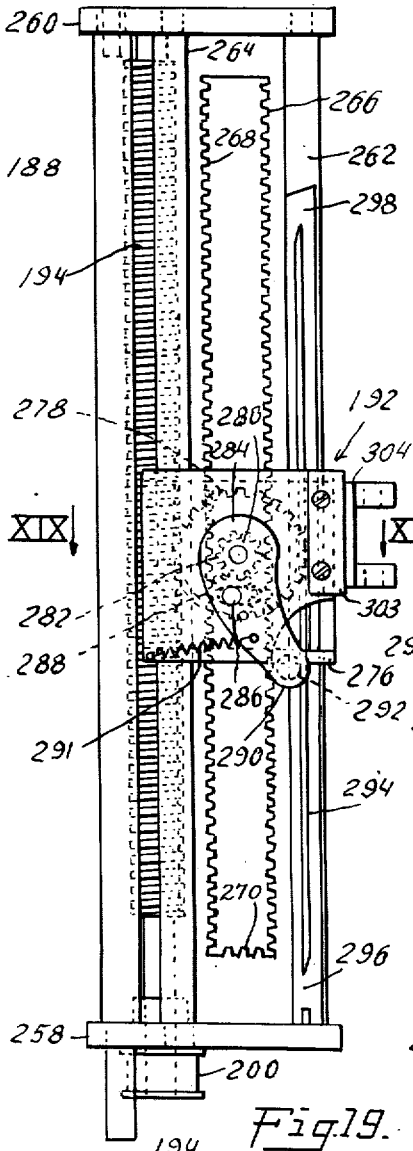
Figure 16:
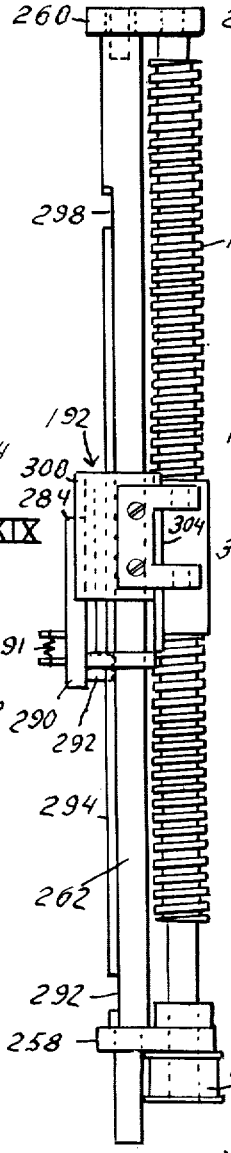
Figure 17:
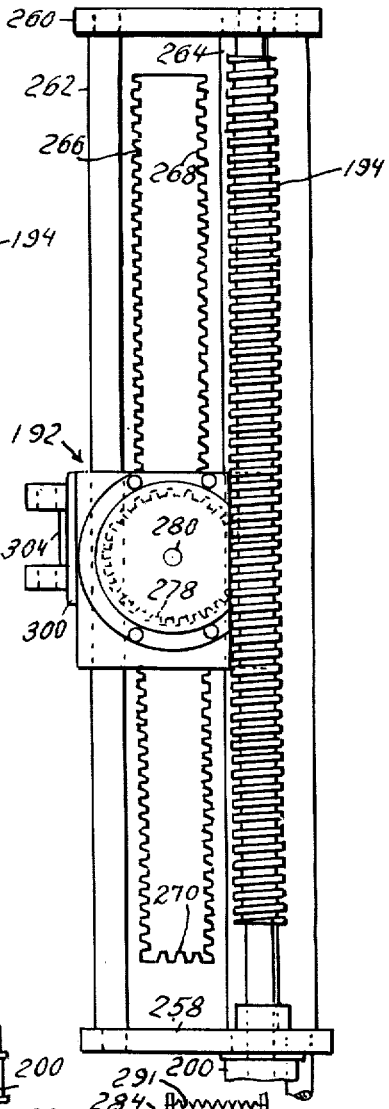
Figure 19:
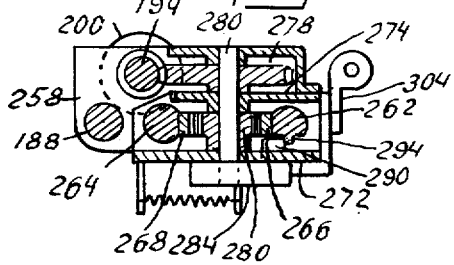
Figure 18:
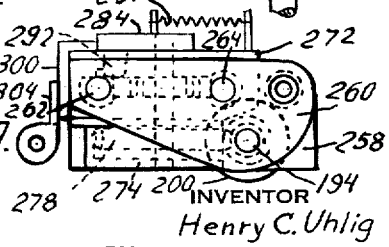
Figure 20:
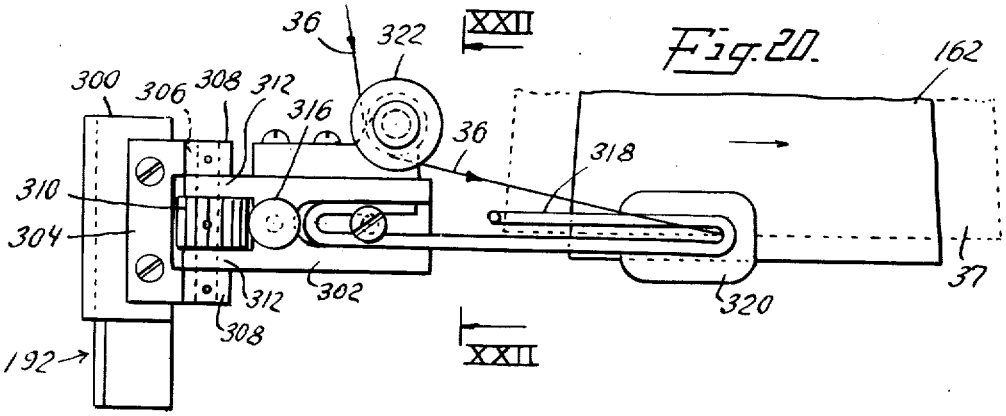
Figure 21:
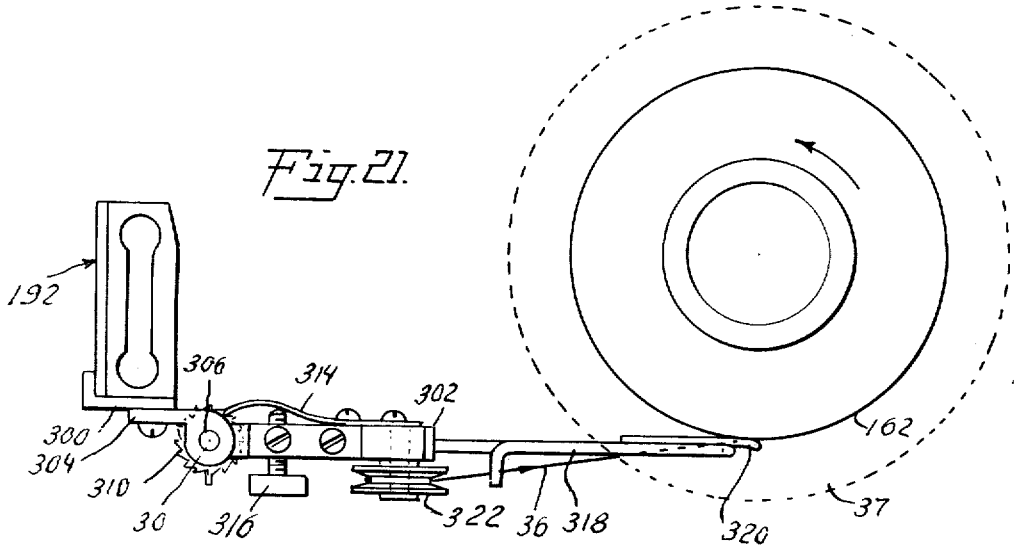

Figure 3 is a somewhat diagrammatic view in vertical transverse section through the apparatus, the spindles, at the left in Figure 3, being shown as they appear from the line III—III in Figure 2, and the supporting structure therefor, at the right in Figure 3 being shown as it appears from a vertical transverse plane through line III—III and thus through the right-hand end of the frame shown in Figure 1;

Figure 4 is a view in plan of the apparatus shown in Figures 2 and 3;

Figure 5 is a view in vertical section through the axis of the double twisting device serving as a support for a yarn supplying bobbin;

Figure 6 is an enlarged view in vertical section showing details of construction of the device shown in Figure 5;

Figure 7 is a view in side elevation of a stationary yarn tensioning device employed in the apparatus shown in Figure 5;

Figure 8 is a view similar to that of Figure 7 with the tensioning device turned 90° about its longitudinal axis;

Figure 9 is a view in section through the longitudinal axis of the yarn tensioning device, in operative condition, the section being taken along the line IX—IX in Figure 7;

Figure 10 is a view similar to that of Figure 9 with the yarn engaging and tensioning blocks open;

Figure 11 is a view in perspective of a yarn engaging block employed in the yarn tensioning device;

Figure 12 is a view in vertical section through the axis of the cabling reel unit;

Figure 13 is a view in cross-section through such cabling reel unit, the section being taken along the line XIII—XIII in Figure 12;

Figure 14 is an enlarged view in vertical cross-section through the base of the cabling reel unit, the section being taken along the line XIV—XIV in Figure 13;

Figure 15 is a view in front elevation of the traverse mechanism for the loading finger employed with the cabling reel unit;

Figure 16 is a view in side elevation of such traverse mechanism;

Figure 17 is a view in rear elevation of the traverse mechanism;

Figure 18 is a view in plan of the traverse mechanism;

Figure 19 is a horizontal section through the traverse mechanism, the section being taken along the line XIX—XIX in Figure 15;

Figure 20 is a fragmentary view in side elevation of the loading finger supporting unit;

Figure 21 is a view in plan of the unit shown in Figure 20; and

Figure 22:
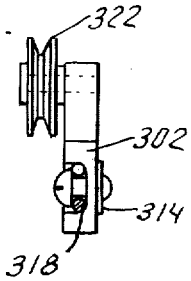

Figure 22 is a view in vertical section through such unit, the section being taken along the line XXII—XXII in Figure 20.

The preferred embodiment of the yarn twisting apparatus of the invention, which is shown more generally in Figures 1 to 4, inclusive, includes a framework generally designated 2, of which the corner vertical supports are designated 4, the lower front cross member 6, the lower rear cross member 8, the intermediate rear cross member 14, the top front cross member 10, and the top rear cross member 12. In Figures 2 to 4, inclusive, such framework is generally omitted, only the additional lower cross member 46 forming the supporting means for the yarn twisting units and the cabling reel unit being shown. Member 46 is attached to intermediate end frame members, of which one is shown at 16 in Figure 1. In the apparatus illustrated, there are employed two bobbin supporting and yarn twisting devices, the left hand such unit being designated 20, and the right hand such unit being designated 22. It is to be understood that the invention is not limited to the use of two such units, each supplying a twisted thread to the cabling reel unit, but that there may be employed any desired number, from two upwards, of yarn twisting devices, depending upon the number of twisted threads desired in the cord. It is also to be understood that whereas in the device shown the two threads are twisted separately in the same direction (hand) and are twisted together to form a cord in the direction (hand) opposite to the twist of the individual threads, such procedure is subject to variation as desired. Thus it is possible to twist the threads themselves and the threads together all in the same direction, or to twist some of the individual threads in one hand and some in the other. In the last case, the threads will usually be twisted together to form a cord in a direction opposite to that of the twist of the majority of threads being twisted together.

The cabling reel unit shown at 24 is preferably although not necessarily, located between twisting devices 20 and 22. In the embodiment shown, the axes of spindles 20, 22, and 24 lie in a common plane. The axes of spindles 20 and 22 are spaced equal distances from that of spindle 24, as shown in Fig. 2. Capstan 33 is located with its axis substantially at a right angle to the axis of spindle 24, the axis of spindle 24 substantially intersecting the capstan, as is evident from Figs. 1–4, inclusve. As a result, threads 28 and 32 travel substantially equal distances from their respective guiding eyes 114 to capstan 33. Generally the yarn, shown wound on a bobbin at 26 in twisting device 20, is fed therefrom in the form of a twisted thread 28, and the similar yarn shown at 30 in twisting device 22 is fed therefrom as twisted thread 32. Preferably the yarn is in the form of "flat yarn," that is, one in the form of a tape of generally rectangular cross-section, the width of the tape materially exceeding its thickness. The two such twisted threads are brought together at capstan 33 in parallel untwisted relationship, from the stepped capstan 33 continuing their travel in such relationship through the compensator and shock absorber generally designated 35, from which they emerge, as shown at 34. In that portion of its travel downwardly from the compensator until it enters the cabling reel unit 24, the two threads are given one twist about each other, and in that portion of its travel shown at 36 in which it rises through the center of the cord receiving bobbin, it receives another twist, following which is is laid or loaded onto the bobbin, as shown at 37.

The yarn twisting devices 20 and 22, the cabling reel unit 24, and the stepped capstan 33, are all driven by means of the vertically mounted electric motor 38 secured to the frame as shown, the motor carrying pulley 40 over which and the idler pulley 44 is trained the flat belt 42. The idler pulley is supported on member 46 by means of the intermediate support 48, devices 20, 22, and 24 likewise deriving their support from member 46. Member 46 is braced against turning by reason of the connection between part 58, attached thereto, and a cross member of the frame. (See Figure 3.) Such frame cross member has a front portion 59 at right angles to the spindles terminating at member 58, and a horizontal rear part 61 attached to the rear of the frame. Device 20 is supported on a sleeve, shown at 50, connected to intermediate support and journal bearing 52. Device 24 is provided with a supporting sleeve, generally designated 56, which is supported in the member 58 which also includes bearings, and device 22, which is similar in all respects to device 20, has the supporting sleeve 62 held in the support 64. As will be apparent from Figure 2, the two yarn twisting units and the cabling unit are provided with drive pulleys engaging the same run of belt 42, pulley 67 for unit 20 and pulley 66 for unit 22 being positioned in front of such run of the belt 42 shown in Figure 2, and pulley 60 for unit 24 being positioned in back of such run of the belt. Thus pulleys 66 and 67 and the parts of units 20 and 22 connected thereto, respectively, rotate in one direction, and pulley 60 of unit 24 and the parts connected to such pulley rotate in the opposite direction.

The structure of the yarn supplying and yarn twisting units 20 and 22 will be more readily understood by reference to Figures 5 and 6, which show in detail the structure of unit 22. The supporting sleeve 62 is attached, as shown, to the intermediate support 64. Such sleeve carries journaled within it an upright spindle of which the bottom portion is designated 68, and the upper axially bored portions integral therewith is designated 74. A ball bearing 70 is provided between the spindle and sleeve at the bottom ends of both, and a ball bearing 72 is provided between the spindle intermediate its ends and the upper end of the sleeve. The spindle thus rotates freely in its supporting sleeve.

The axial passage through the upper portion of the spindle is shown at 76. Such passage communicates at its lower end with a segmental slot 78, the inner wall of which is curved as shown. The upper end of spindle part 74 is provided with a yarn engaging twisting guide 80 fastened thereto to rotate with the spindle. Guide 80 may be any one of a number of conventional devices for such purpose. In its preferred form, such guide takes the form of two twisting blocks having generally flat confronting faces spaced slightly apart, between which the yarn travels. Such blocks may have a configuration similar to that of block 128 (Figure 11), except that their rear faces need not be rounded. The spindle 68 is rotated by means of the pulley 66 keyed thereto, the spindle also carrying the thread twisting delivery disc 82 having the radially directed cable tube 84 located therein, the inner end of which, as shown more clearly in Figure 6, communicates with the segmental slot 78. Rotation of the pulley 66, as is clearly apparent from Figures 5 and 6, rotates the disc 82 and twisting guide 80.

Supported on the spindle in floating relationship therewith is the bobbin supporting structure, indicated generally at 86. Such structure includes the upstanding sleeve 88 surrounding spindle part 74, the sleeve being supported on the spindle through the medium of the upper ball bearing 90 and the lower ball bearing 92. Structure 86 also includes the radially directed disc portion 94 having the depending flange 96 thereon. Such structure 86 is provided at one zone with a weight, shown at 97 in the form of a cast lead mass, so that the floating bobbin supporting structure is unbalanced. When the structure shown in Figure 5 is mounted as shown in Figure 1, with its axis at a substantial angle to the vertical, structure 86 tends to remain with the weight 97 positioned downwardly.

The bobbin shown at 98 is fixedly positioned on supporting structure 86, the stationary tension device 100 being positioned within the bobbin and coaxially thereof by means of the supporting member shown at 102. Device 22 is covered by the outer can 104 attached to the outer face of flange 96 and by the conical cover 106 fitting on top of the can. When the device shown in Figure 6 is operated by driving pulley 66, untwisted flat yarn, shown at 108, is fed from the bobbin into the upper end of the tension device 100. The yarn engaging paws of such device, subsequently to be more fully described, are as stated, stationary, with respect to the bobbin, and thus the yarn is given a first twist in the portion 110 between tension device 100 and rotary twisting guide 80. The single twisted thread, designated 112, is fed downwardly through passage 76 in the spindle into cable tube 84, from the outer end of which it is fed upwardly to the stationary eye 114, which is attached to a part of the machine frame. In that portion of its travel shown at 116, from the outer edge of disc 82 to the eye 114, the thread receives a further twist; thus the devices 20 and 22 shown are called "double twisting spindles." The floating mounting of the bobbin support cushions the yarn against accelerations such as occur when the machine is started. When the machine has come up to speed and the parts have reached equilibrium, support 86, as stated, tends to float in one position and merely to rock thereabout rather than to rotate about the spindle.

*Spindles 20 and 22, which may also be called "two-for-one" twisting spindles, effect an operation which is sometimes termed "two-for-one" twisting.*

By reason of the rotation of disc 82 in each of spindles 20 and 22, each of the threads 28 and 32 fed from such spindles, respectively, upwardly through eye 114 forms a balloon which travels in free flight through the air, as indicated in Fig. 2. Eyes 114 are located coaxially of the spindles and above them, as indicated in Figs. 2 and 3, each eye 114 being located the same distance from the top end of its respective spindle. Thus when the yarns forming threads 28 and 32 are substantially identical, because of the substantial identity of the spindles 20 and 22 and of the speeds at which they are rotated, the ballons formed in threads 28 and 32 in the portion 116 of the run of each will be substantially identical in width and the tensions in such threads 28 and 32 will be substantially the same when the tension device 100 of each of spindles 20 and 22 is adjusted to the same point.

The stationary tension device 100, positioned within the bobbin 98, is more clearly shown in Figures 7–10, inclusive.

In Figures 7 and 8 the device is shown in side elevation in positions turned 90° about its longitudinal axis. In Figure 9 it is shown in longitudinal section with the tension blocks together in operative relationship, and in Figure 10 it is shown with the springs which tend to thrust the tension blocks together relieved from contact with the blocks so that tension is removed from the yarn passing between such blocks.

The tension device comprises an elongated main body having a cylindrical upper end 118 and a lower end 120 generally square in cross-section. The upper end 118 has an axial bore 122 therethrough, and the lower end has an axial bore 124 through it, so that yarn may be passed longitudinally through the body. The lower end 120 is provided with a transverse passageway 126 within which the tension blocks 128 are slidably received. To facilitate removal of the tension blocks, body 120 is provided with a further transverse slot 129 at right angles to passageway 126, so that the blocks may be removed from the device through slot 129. The outer ends of slot 129 are partially covered, as shown in Figure 8, by the removable cover plates 127.

The tension blocks are generally in the shape of rectangular parallelopipeds, the outer ends 130 of which have a generally cylindrical configuration as shown. The inner yarn engaging face 132 of each block is flat, each block having on the upper edge thereof, which first meets the yarn in its travel thereby, a recess 134 in the shape of one-half a cone, the apex of which is positioned downwardly. When the two blocks 128 are pressed together the recesses 134 cooperate to lead the yarn therebetween in a path centrally thereof.

The two blocks 128 are pressed together with a predetermined force, thus allowing a predetermined tension to be placed upon the yarn, by the leaf springs 136, one spring being positioned in each of the oppositely disposed longitudinal slots 138 in the outer face of body 120. Each such spring has its lower end bent outwardly back upon itself, the spring being maintained in the slot by engagement of the hooked end 139 of such outer end of the spring partially around the cross-pin 140 in slot 138. The forward end of the spring 142 is bent inwardly and then outwardly as shown. The configuration of the spring is such that, when the forward ends 142 are not pried apart, the springs lie flat upon the bottom of the slot 138 and press blocks 128 together, when no yarn is passing between them, so that their faces 132 are in contact.

The tension device is provided with a means whereby the amount of force imposed upon the blocks by the springs, and thus the tension upon the yarn passing through the device, may be varied. In the preferred embodiment, such means takes the form of the sleeve 144 fitting about body 118, the sleeve having on its forward or lower end a shoulder 146 in the form of a cone converging toward the body 120. The sleeve may be adjusted longitudinally of body 118 by means of the nut 148 threaded upon the upper end of such body 118. By rotating the nut 148 in such direction as to thrust sleeve 144 to the left, in Figure 9, the ends 142 of the springs may be biased outwardly by the shoulder 146 in predetermined amounts, thus varying the force which the springs 136 exert inwardly upon blocks 128. The configurations of shoulder 146 and ends 142 of the leaf springs, and the total length of travel of sleeve 144 to the left, are so selected that the sleeve may be thrust to its stable end position at the left, as shown in Figure 10, to allow the blocks 128 freely to be thrust apart by yarn passing through and thus to relieve the yarn of any retarding tension.

The structure of the cabling reel unit 24 will be more readily apparent from a consideration of Figures 12, 13, and 14. As shown in Figure 12, supporting sleeve 56 is fixedly attached to support 58 and carries, rotatably mounted within it, the spindle 152, the lower ball bearing 154 and the upper ball bearing 156 providing such support of the spindle in the sleeve. In its upper portion spindle 152 is provided with an axial bore 158 for the reception of a cord guide, as will more clearly appear hereinafter.

Floatingly mounted on the upper end of the spindle is a structure for supporting bobbin 162. Such structure includes the base member 160 supported on the spindle through the medium of the upper and lower ball bearings 164 and 166, respectively, and the mandrel 168 forming an extension of structure 160, the two parts 160 and 168 having upwardly converging conical surfaces, as shown, for supporting and driving connection with the inside of the bobbin 162.

The cabling reel unit of the invention includes means whereby the cabled yarn or cord is reeled with a predetermined amount of tension. Although such tension determining means may take the form of a friction slip-clutch, in the preferred embodiment of the device there is employed a magnetic slip-clutch. Such device is made up of the outer cage member 170, shown attached to and depending from the bottom of structure 160, and the inner rotor member 172 keyed to the spindle 152. The structure of such magnetic slip-clutch, which will be more fully explained in connection with Figures 13 and 14, is such that rotation of member 172 within member 170, the latter of which includes a strong permanent magnet, induces current in the first member and thus yieldingly connects the two members for rotation together. Thus structure 160 and the bobbin mounted thereon is yieldingly driven from the spindle 152.

On the spindle 152 there is also mounted a disc 174 which is fixedly connected to the pulley 60. The disc 174 forms the base to which the cylindrical partial cover in the form of a can 176 is attached. Such can provides support for the U-shaped tubular cord guide 178, the outer leg 180 of which is secured in upright position to the inside of the can, the bottom portion 182 of which is positioned radially on top of disc 174, and the other or inner leg 184 of which is positioned within the bore 158 in the upper end of the spindle 152.

Also mounted on the spindle 152 is the disc 186, which is floatingly connected thereto through the medium of the ball bearings 187. Disc 186 serves as the support for the plurality of spaced upright standards 188, the tops of which are connected by the ring 190. Disc 186 is provided in one zone thereof with a heavy weight, such as the poured lead weight 189, so that the disc is unbalanced and that thus when the spindle is positioned at a substantial angle to the vertical, as indicated in Figure 1, the disc 186 and the structure attached thereto tend floatingly to remain in one angular position with weight 189 downwardly. Disc 186 also serves as support for the walker unit 192 and the frame therefor, more clearly shown in Figures 15 to 19, inclusive, by which the cord loading finger is supported and traversed up and down the length of the bobbin 162. In general such device includes the vertical rotatably mounted worm 194 driven from spindle 152 by means of the pulley 196 thereon, the flat belt 198 trained about such pulley and about pulley 200 on the bottom end of the worm. As shown in Figure 13, there is provided a spring tensioned idler pulley 202 about which such belt runs, the idler pulley being mounted on the end of the arm 204 pivotally mounted on disc 186, the arm being impelled outwardly by means of the coil spring 206.

The magnetic slip-clutch includes in its cage 170 the permanent magnet 208 the top surface of which is spaced from the bottom surface of part 160 as shown in Figures 12 and 14. Magnet 208 has a plurality of equally spaced pole pieces 210 formed on its inner, generally cylindrical surface. Such magnet is preferably made from the materials having high permeability, such as the alloy composed of 24–30% Ni, 9–13% Al, balance Fe, and the alloy composed of 24–30% Ni, 9–13% Al, 5–10% Co, balance Fe. The inner rotor 172 has its main body portion 211 made of soft annealed steel, there being provided on its periphery a sheath of non-magnetic metal 212 of high electrical conductivity, such as copper to provide a low resistance path for the eddy currents. It will be apparent that relative rotation between parts 170 and 172 induces electric currents in part 172, as in the rotor of a squirrel cage motor, and that the cage and rotor are thereupon coupled magnetically. The amount of torque at a given relative speed between the parts 170 and 172 depends upon the air-gap between them. Consequently variation of the air-gap by suitable dimensioning of the parts allows the selection of a predetermined amount of tension on the cord wound on the bobbin 162 driven by casing 170 of the clutch.

Because normal operation of the device involves considerable slip between the rotor and cage and thus appreciable eddy currents, there is substantial heating of the rotor. Heat is dissipated therefrom by providing a series of vertical holes 214 through the body 211 of the rotor 172, a series of holes 215 in disc 186, and an air impeller in the form of a fan 216 keyed to the spindle beneath member 174. When the spindle is rotated cooling air is thus caused to flow, as shown by the arrows in Figure 12, upwardly through the rotor 211, thence laterally into the space between the top of magnet 208 and the bottom of part 160, and finally outwardly through the angularly spaced radial openings 175 through the outer part of rotor 170 below the bottom surface of part 160.

The stepped capstan 33 at which the two twisted threads 28 and 32 are combined in untwisted side-by-side relationship also constitutes the means by which the number of turns per inch (pitch) in the cabling operation is governed. The capstan, which is shown with the three steps 218, 220, and 222 which are smoothly dished in axial cross-section, is driven at a speed bearing a definite relationship to the speed of rotation of the spindle 152, and thus at least approximately to the speed of rotation of the bobbin 162. The capstan, of course, receiving as it does threads 28 and 32 from units 20 and 22, respectively, also determines the rate of paying out of the single twisted threads from such units by at least substantially positively pulling the threads from the outer ends of the balloons in the threads created and maintained by their respective spindles 20 and 22. Variation in the number of turns per inch of the twist (pitch) in the single twisted threads may be accomplished by changing the diameter of drive pulleys 66 and 67 relative to that of pulley 60 driving the cabling reel unit. The surfaces of the steps 218, 220, and 222 of capstan 33 are each, in the embodiment shown, of partial toroidal shape. Such surfaces function, in the feeding of the combined but untwisted threads, in a manner more fully set out hereinafter.

The capstan 33 is affixed to the forward end of the cross shaft 224 journaled in pillow blocks on the top of the machine frame. Such shaft is driven through the medium of chain 228 which runs over sprocket 226 on the rear end thereof, and sprocket 242 on drive shaft 238, shown at the bottom in Figure 2. An adjustably positioned idler sprocket 230 is provided to maintain the chain 228 taut. Shaft 238 is driven from spindle 152 by means of the worm 232 affixed to the bottom of the spindle, such worm meshing with worm gear 234 keyed on the forward end of shaft 236, the shaft being journaled in pillow blocks, as shown, on the machine frame. Because spindle 152 is positioned at an angle to the vertical, a universal joint 240, shown for simplicity in straight condition in Figure 3, but actually driving through a marked angle in the device shown in Figure 1, is employed. As above explained in connection with the manner of supporting member 46, the front part 59 of the frame cross member, which is disposed at right angles to spindle 152, is, in the actual machine, tipped at an angle to the horizontal equal to that which spindle 152 makes with the vertical. Part 61 of the frame cross member, and shafts 224 and 238 are horizontal in the actual device.

Major changes in the speed ratio between shaft 152 and shaft 224, and thus changes in the number of turns per inch (the pitch) in the cabling operation, are effected by the use of suitable ratios of sprockets 226 and 242. Minor changes in the pitch of the cabled cord, that is, number of turns per unit length, are made by shifting the threads 28 and 32 to the appropriate step of the capstan, such steps filling smoothly the gaps in the speed ratio obtainable by sprocket changes.

Each of steps 218, 200, and 222 of capstan 33, besides acting as a gathering point for the threads delivered from the twisting spindles 20 and 22, also functions as an automatic tension compensator and equalizer. The threads continually try to travel to the end of the step over which they are trained, because the speed of the end and thus its frictional drag on the threads is greater than that of the center of the step. Slippage between threads and capstan step, however, limits travel of the threads toward the end of the step. The continual movement or "walking" of the threads axially of the capstan step tends to even out variations in tension in the threads. Thus the capstan 33, together with the compensator and shock absorber 35, [function to feed the threads to be cabled to the cabling spindle under uniform tension.] *applies a compensating tension to the threads passing thereover to control the balloons of the spindles 20 and 22, and functions to feed the threads to be cabled to the cabling spindle under uniform tension. As a result, the balloon of device 24 is also controlled by the compensating tension applied to the combined as yet uncabled, threads passing over capstan 33 and through device 35.*

The combined threads 28 and 32 untwisted on each other, fed from the capstan 33, travel to the compensator and shock-absorber 35 shown in Figure 2. Such device, which has an elongated horizontally disposed main frame 244, is supported from member 10 of the machine frame by the depending support 246. The compensator includes a thread guide pulley 248, the supporting block 251 of which is mounted for longitudinal travel on the longitudinal rod 250 supported by the body 244, parallel thereto but spaced therefrom, pulley 248 being thrust to the right in Figure 2 by means of the compression spring 252. Block 251 is bored to receive rod 250 therethrough, a key connection (not shown) being provided between block and rod to prevent turning the block on the rod. The compensator is further provided with a fixed idler pulley 254 and a dead eye 256 as shown in Figure 2, so that the combined threads fed downwardly from the capstan are first led over pulley 248, thence to the left around pulley 254, and from there through the dead eye 256 from which it emerges at 34 to travel downwardly and into the leg 180 of guide tube 178 of the cabling reel unit. Eye 256, as shown in Figs. 2 and 3, is located substantially coaxial with spindle 24, and between the upper end of such spindle and capstan 33. Thus the bolloon which forms in the cord 34 between eye 256 and cord guide 180 is symmetrical about the axis of spindle 24.

The construction of the walker unit 192 and of the frame on which it travels will be clearly apparent by a consideration of Figures 15 to 19, inclusive. The frame on which such unit travels is mounted on the cabling reel unit 24, as shown in Figures 12 and 13, parallel to the axis of the spindle 152. Such frame consists of the bottom cross member 258, a similar top member 260, a first longitudinally extending frame member 262, and a second such member 264 parallel thereto. One of the standards 188 is, as shown, also utilized in forming such frame. Such frame is attached between the disc 186 and the top 190 so as to be fixed thereon.

The two longitudinal members 262 and 264 are provided with inwardly facing rack gears 266 and 268, respectively, the bottoms of such rack gears being connected by a short horizontal rack 270. The walker unit 192 is made up of the front plate 272 and the rear plate 274, such plates being connected by suitable cross members, of which one is shown at 276 in the form of a bottom plate for such unit. The unit 192 is mounted and guided on the framework so as to travel from top to bottom thereof, such travel being effected as follows; the worm 194 is, as we have seen, driven by spindle 152 through the medium of belt 198, and pulleys 196 and 200. The walker unit 192 has mounted therein a transverse shaft 278 on one end of which there is affixed the worm gear 278 meshing with worm 194. Also keyed to shaft 280 is a pinion 282. Journaled on the walker unit frame coaxially of shaft 280 is a cage 284 which is provided with a cross-shaft 286 carrying a pinion 288 constantly in mesh with pinion 282. Pinion 288 has a diameter somewhat less than the distance between rack gears 266 and 268. Thus, rocking of the cage 284 in a clockwise direction (Figure 15) causes pinion 288 to mesh with rack gear 268 and rocking of such cage in a counter-clockwise direction frees pinion 288 from contact with rack 268 and causes it to mesh with rack 266. The cage is provided with an arm at 290 and with a cam follower 292 on the end thereof, such cam follower cooperating with the upstanding cam track 294 affixed to frame member 262. The cam track is provided at its bottom with an opening 296 through which the cam follower 292 may pass. The cam track terminates at its upper end at 298. In order to position cage 284 stably, a coil spring 291 is positioned between the arm and the frame of the walker unit to urge the cage in a clockwise direction, as shown in Figure 15.

From the above description the manner of operation of the walker unit will be apparent. Rotation of worm 194 in one direction drives worm wheel 278 and thus pinions 282 and 288, causing such latter pinion to climb up or down the rack with which it is in mesh carrying with it the unit 192. Assume for example, that the worm is driven in such direction that the walker unit is progressing downwardly (Figure 15). When pinion 288 reaches the bottom of rack 268 it then meshes with transverse rack 270, which causes cage 284 to be rocked counter-clockwise, against the action of spring 291, since at this point the cam follower 292 lies opposite opening 296 in the cam track. The follower then travels upwardly to the right of the track, thus preventing the spring 291 from returning the cage to its former position. Pinion 288 then meshes with rack 266, and, still rotating in the same direction, causes the walker unit to climb in the frame. The unit continues travel in such direction until the cam follower 292 clears the upper end 298 of the cam track. Spring 291 then turns the cage clockwise to cause it to assume the position shown in Figure 15, so that the unit then again travels downwardly.

The walker unit above described forms the support by which the loading finger is traversed up and down the length of the bobbin 162. Support for such finger on the walker unit is afforded by the mounting plate 300, to which the loading finger and the support therefor more clearly shown in Figures 20, 21, and 22, are attached.

Such loading finger support consists of the main body 302 which is pivotally mounted on an axis parallel to the axis of the bobbin on the attaching means 304. Means 304 in turn, is attached to plate 300. Means 304 has two spaced ears 308 between which are received the spaced ears 312 on the rear end of body 302. A shaft 306 is received in openings through the two pairs of aforementioned ears, being pinned as shown to ears 308. A toothed or ratchet wheel 310 is positioned on shaft 306 between ears 312 and is pinned to such shaft. There is provided a pawl in the form of leaf spring 314, the forward end of which is secured to the body and the rear end of which normally impinges on the ratchet wheel. It will be seen, particularly by considering Figure 21, that when the pawl 314 is in operative relationship, body 302 may be swung quite freely in a clockwise direction but it is prevented from moving counter-clockwise by the pawl. Thus the loading finger mounted on body 302 is prevented from becoming jammed against the bobbin 162 or the cord 37 wound thereon. The finger is initially positioned by being placed in contact with the bobbin or the cord wound thereon, at its greatest diameter, after which the finger is automatically thrust outwardly at each repeated contact between it and the portion of the wound cord of greatest diameter. The pawl may be released to swing the body 302 counter-clockwise, when required, by means of the plunger 316 which when pressed upwardly (Figure 21) removes the rear end of the pawl from contact with the ratchet wheel 310.

The loading finger, shown generally at 318, is adjustably mounted on the forward end of the body 302 so that it may be varied in its effective length. The forward end of the finger is provided with a guide shoe 320 which lies close to or engages, as the case may be, the outer layer of cord on the bobbin, thus insuring correct placement of the cord being laid. Body 302 is also provided with an idler pulley 322 under which cord 36 travels prior to its entry in the guide opening in the shoe 320.

The cabling reel unit 24 is also provided with an upwardly and inwardly inclined guide arm 324 positioned on top of ring 190, such arm carrying the upper idler guide pulley 326 and the lower idler guide pulley 328. The two threads 28 and 32, combined, as explained, in untwisted parallel relationship at the capstan 33 travel in that condition through the compensator 35. Immediately on emerging from eye 256 the two threads are cabled. The first twist of such cabling is given them in that portion of their travel in which the cord forms a loop or balloon which travels in free flight through the air, that is from the eye 256 to leg 180 of the cord guide tube, by reason of the rotation of the disc 174 and thus the cord guide carried thereby. Such first twisted cord is then given a second twist, in the same direction, in that portion of its travel, shown at 36, from the inner end of leg 182 of the cord guide to upper guide pulley 326. *The cabling or take-up reel or twisting unit 24 thus functions to "two-for-one" twist the elongated flexible material such as the cord passing thereinto, and may properly be called a "two-for-one" twisting and coiling spindle.* The double twisted cord then travels downwardly around the guide wheel 328, under guide wheel 322 on the walker unit, and thence to the shoe 320 of the loading finger 318 where it is laid on the bobbin 162 to form the wound package 37.

*The overall operation of the illustrative embodiment may be summarized as follows:*

*The yarn extending from each of the singles or supply twisters 20 and 22 undergoes one twist per spindle revolution while in the twister and is given a second twist by being spun around the twister or source of supply in the form of a free-flying balloon which exerts centrifugally a pull at its supply end counteracted by the back tension of the tensioning device on the twister spindle. A similar pull or tension exists on the twisted material at the other or outer end of this balloon. From there the material extends over the gathering pulley and the compensator in gathered relation to similar material extending from the other supply balloon, and thence it enters directly into the outer end of the central cabling or take-up balloon which spins freely around the take-up twister 24. The cabling or take-up balloon exerts centrifugally a pull on the material opposing the pull exerted thereon by the supply balloon or balloons, and differences between these opposing pulls or tensions are compensated by the frictional slip driving action of the gathering pulley and/or the variable drag of the spring tensioned compensator. Thus the several balloon formations are continuously maintained even though the materials undergo continuous longitudinal travel from the yarn supply bobbins to the cord storage bobbin.*

*The material at the inner or lower end of the cabling or take-up balloon extends into the flyer and spindle of the take-up twister and thence is drawn in and reeled on the bobbin of this twister, having been twisted once per take-up twister revolution while in the flying balloon and twisted a second time while passing to and through the spindle. Since the supply and take-up balloons spin in a counterbalanced relation and automatically maintain balancing tensions at their respective outer and inner ends, the continuous positive drawing or winding in of the cabled material simply causes continuous longitudinal travel of the materials through the balloons from the supply bobbins to the cord bobbin, and in the course of this travel two complete two-for-one twistings are imparted to produce a multiple twisted material or cord of high quality in a simple and economical manner.*

*The capstan or gathering pulley 33, referred to above, imposes compensating tension upon the strands passing around it from the singles balloons and extending to the central or cabling balloon, by reason of the following: Capstan 33 is rotated by a positive drive connection at a speed correlated to the speed of the singles twisters and the speed of the cabling twister, and has frictional engagement with the gathered strands wrapped around it. The gathering means thus serves as a tension-producing means, or in other words as a compensating tension imposing means, in either of two ways: When the conditions of operation are such that the tension in the gathered strands entering the cabling balloon exceeds the sum of the counteracting tensions in the strands leaving the singles balloons, which is the case when the apparatus of the invention is used for twisting rayon yarns into cord, to form a cord such as tire cord, the gathering pulley imposes a frictional resistance against travel of the strands at a speed greater than its peripheral speed and thus counteracts the excess tension of the cabling balloon. Under these conditions the gathering means retards the travel of the gathered strands, and its drive connection can serve only to control the rate of strand travel by restraining the rotation of the gathering means. If the conditions of operation are such that the sum of the tension of the strands leaving the singles balloons is greater than the tension in the gathered strands entering the cabling balloon, the gathering pulley 33 overcomes the excess tension on the singles side of the system and thus serves as a driving means to keep the strands advancing into the cabling balloon at a substantially constant speed. In the particular form of apparatus shown, the magnitude of the retarding counter tension or the forwarding pull exerted on the strands by the gathering means, according to the conditions of use of the machine, depends upon the resistance existing at the pulley 33 against free movement of the strands, i. e., in this form upon the resistance exerted by the pulley against free relative motion or slippage between the gathered strands and the pulley; and this in turn is affected by several factors including the area of contact therebetween, the shape of the pulley, and the coefficient of friction between the strands and the pulley.*

*The strand guiding eyes 114 of the singles spindles 20 and 22 and the similar guiding eye 256 of the doubles spindle 24 are all positioned coaxially of their respective flyers and, in the embodiment shown, in fixed positions at definite distances therefrom so that the strand portions forming the balloons at the respective spindles can be whirled about the axes of the spindles as free-flying loops or balloons having distinctly bowed forms and each having a definite height as measured from the flyer to the corresponding eye. In the doubles spindle 24 the laying of the cord upon the bobbin is effected without change of the balloon height by action of the cord traversing or "walker unit," previously described, rather than by axial travel of one spinning part of the spindle relative to another spinning part of the spindle as in some known multiple twisting spindles.*

*The bowed form of the ballooning strand portion between the eye and the flyer of each spindle and the extension of that portion from a source under a definite tension enable each strand portion to keep itself in a substantially stable flying condition while it is being twisted in the balloon. When its bowing or radius of rotation is reduced by its twisting action or by an excess travel of the strand from the balloon, its pull on the incoming material will increase so as to draw additional material into the balloon and thus restore a normal position; while if its bowing is increased its pull on the incoming material will decrease. Since material leaving the balloon of each singles or supply spindle at its guiding eye extends to the eye and thence into the separate balloon of an isolated cabling or take-up spindle, a constriction of the latter balloon can cause a corresponding change in the singles balloon or balloons,*

*which in turn can correct itself through the attendant pull of each singles balloon on the material coming into it from the tensioning device of the singles spindle.*

*Further, since the distinct balloons form isolated though interconnected spinning systems, the axial length or height of each balloon can be selected so as to obtain a desired large material holding capacity within its orbit, and yet so as to have its pull on the balloon-interconnecting portion of the strand material desirably related to the opposing pull thereon of the connected balloon.*

Because the twisting operations involved in progressing from yarn to cord all take place continuously and without stoppage of the material, the cord resulting therefrom is characterized by its uniformity. This follows from the fact that the twisting of all threads and that of the threads together to form a cord, are all correlated, thus insuring the production of a cord of accurately predetermined uniform construction. The process, and the use of the apparatus of the invention, are also distinguished by their speed, their economy, and their lack of necessity for the continuous attention of an operator.

Whereas I have described and illustrated preferred embodiments of the method, the apparatus, and the component units of the apparatus, of the invention, it will be understood that the invention in its broader aspects is capable of considerable variation as to details. The invention is therefore, not limited to the embodiments thereof shown and described, but is defined by the scope of the following claims.

I claim as new the following:

[1. The method of forming stranded cord from a plurality of yarns in one continuous operation, comprising the following steps in the order named: feeding each of a plurality of yarns in the direction of its length from its separate source of supply, during such feeding separately twisting the yarns to form threads, gathering such threads into generally parallel relationship, forwarding such threads in such relationship, forming a loop under yielding tension in such forwarded threads, feeding the threads together from the loop, and twisting the thus fed gathered threads together to form a cord, the first twisting, the gathering, the looping, and the second twisting steps being performed with the material continuously in motion.]

[2. The method of forming stranded cord from a plurality of yarns in one continuous operation, comprising the following steps in the order named: feeding each of a plurality of yarns in the direction of its length from its separate source of supply, during such feeding separately twisting the yarns all in the same hand to form threads, gathering such threads into generally parallel relationship, forwarding such threads in such relationship, forming a loop under yielding tension in such forwarded threads, feeding the threads together from the loop, and twisting the thus fed gathered threads together in the other hand to form a cord, the first twisting, the gathering, the looping, and the second twisting steps being performed with the material continuously in motion, the speed of gathering and forwarding of the threads to the loop governing the speed of withdrawal of the yarns from their sources.]

3. The method of forming stranded cord from a plurality of yarns in one continuous operation, comprising [the following steps in the order named:] withdrawing each of a plurality of yarns from its separate source in the direction of its length, separately twisting *such yarns* [each such yarn] *each in a free flying loop* [the same predetermined amount in the same hand] to form threads, gathering such threads *by whirling a free loop of each yarn about its source in a separate orbit* in approximately parallel relationship while continuing the travel of the material, forwarding the gathered threads into a *free flying* loop thereof yieldingly maintained under tension, feeding the threads together from such loop [, and] *while whirling such loop in an orbit isolated from the orbits of the yarn balloons, thereby* twisting the thus fed gathered threads together [in the hand opposite the direction of twist of the individual threads] to form a cord, and yieldingly coiling the resulting cord *within the orbit of the whirling loop of gathered threads,* the twisting of the threads together being so conducted as to form a cord of predetermined pitch, such pitch having a predetermined relation to the pitch of the individual twisted threads, the speed of gathering and forwarding of the gathered threads governing the speed of withdrawal of the yarns from their sources, all of such steps being performed with the material continuously in motion.

4. An apparatus for forming stranded cord from a plurality of yarns in one continuous operation, comprising a plurality of yarn supplying and twisting spindles, each spindle including means for feeding yarn from the spindle and a rotary driven means to twist the yarn into a thread while it is fed from the spindle, means for driving the rotary twisting means of each spindle in such direction as to twist the threads in the same hand, means in the form of a driven sheave receiving the threads from the spindles for feeding them off their spindles and for gathering and forwarding them, means receiving the gathered threads including a coiler, rotary driven means for twisting threads together, before they pass to the coiler, in the hand opposite to the twist of the individual threads to form a cord, means for driving the sheave and the last named rotary twisting means at a predetermined speed relationship, the material traveling continuously from the sources of supply of the yarn to the coiler, and looper means interposed between the sheave and the last named twisting means to store an excess length of gathered threads yieldingly under tension.

5. An apparatus for forming stranded cord from a plurality of yarns in one continuous operation, comprising a plurality of yarn twisting spindles, each such spindle including a source of supply of yarn and rotary means for twisting the yarn into a twisted thread of the same hand, means for driving the rotary twisting means of each spindle, means for gathering and forwarding such threads from the spindles, and means for twisting together the threads in the hand opposite to the twist of the individual threads to form a cord, such last named means being a coiler including a driven rotary cord receiving bobbin, rotary means for twisting the threads together before they are delivered to the bobbin, and means for driving the last named rotary twisting means in synchronism with the rotary twisting means of the spindles, the material traveling continuously from the sources of supply of the yarn through the gathering and forwarding means and to the cord twisting means, and looper means interposed between the gathering and forwarding means and the cord twisting means to store an excess length of gathered threads yieldingly under tension.

6. An apparatus for forming stranded cord from a plurality of yarns in one continuous operation, comprising a plurality of yarn twisting spindles, each such spindle including a bobbin support, a yarn containing bobbin thereon, and rotary driven means to twist the yarn into a thread while it is fed off the bobbin, means for driving the rotary twisting means of each spindle in such direction as to twist the yarns in the same hand, means in the form of a driven sheave receiving the threads from the twisting spindles for feeding their yarns off their bobbins and for gathering and forwarding the threads, and means receiving the gathered threads for twisting them together in the hand opposite to the twist of the individual threads to form a cord, the last named means being a coiling device which includes a bobbin support, a bobbin thereon, means to feed the gathered threads to the bobbin and to wind them thereon, rotary driven means to twist the threads together as they are fed to the bobbin, and means to drive the sheave and the last named rotary twisting means at speeds in synchronism with the speed of the rotary yarn twisting means of the spindles, the material traveling continuously from the sources of supply of the yarn to the coiling device, and looper means interposed between the sheave and the cord twisting means to store an excess length of gathered threads yieldingly under tension.

7. An apparatus for forming stranded cord from a plurality of yarns in one continuous operation, comprising a plurality of yarn twisting spindles each such spindle including a bobbin support, a yarn containing bobbin thereon, and rotary driven means to twist the yarn into a thread while it is fed off the bobbin, means for driving the rotary twisting means of each spindle in such direction as to twist the yarns in the same hand, means in the form of a driven sheave receiving the threads from the twisting spindles and thereby feeding their yarns off their bobbins, and for gathering and forwarding the threads, looper means receiving the gathered threads to store an excess length of gathered threads yieldingly under tension, and means for receiving the gathered threads from the looper for twisting them together in the hand opposite to the twist of the individual threads to form a cord, the last named means being a coiling device which includes a driven rotary bobbin support, a cord collecting bobbin thereon, means to feed the gathered threads to the cord collecting bobbin and to wind them thereon, a rotary driving means, a slip drive means interposed between the rotary driving means and the collecting bobbin support, rotary twisting means driven by the rotary driving means to twist the threads together as they are fed from the looper means to the cord collecting bobbin, and means connecting the sheave and the rotary driving means to maintain their speeds in synchronism with the speed of the rotary yarn twisting means of the spindles, the material traveling continuously from the sources of supply of the yarn to the cord collecting bobbin.

8. The method of forming stranded cord from a plurality of yarns in one continuous operation comprising [the following steps in the order named:] feeding each of a plurality of yarns in the direction of its length from its separate source of supply, imposing a predetermined back tension on each such yarn, during such feeding and after the yarn has left the location of the imposition of the back tension, forming a *free-flying* balloon in each such yarn and separately twisting the yarns *in such balloons* to form threads *by whirling each balloon around its yarn source in a separate orbit*, the axis of the balloon in each yarn extending [in] *of* generally the same direction as that of each [of the] other [yarns] *yarn*, gathering such threads into generally parallel relationship at a point beyond the balloon in each, the location of gathering of the threads being generally the same distance from the outer end of each balloon, forwarding such threads in such generally parallel relationship, forming a *free flying* loop under yielding tension in such forwarded threads, feeding the threads together from the loop [, and] *while whirling the loop in an orbit isolated from the orbits of the yarn balloons, thereby* twisting the [thus fed] gathered threads together *in such free flying loop* to form a cord, *and coiling the cord within the orbit of such loop*, the first twisting, the gathering [,] [the looping,] and the second twisting steps being performed with the material continuously in motion.

9. The method of forming stranded cord from a plurality of yarns in one continuous operation comprising [the following steps in the order named:] feeding each of a plurality of yarns in the direction of its length from its separate source of supply, imposing a predetermined back tension on each such yarn, forming a balloon in each such yarn and separately twisting the yarns to form threads, the axis of the balloon [in] *of* each yarn extending in generally the same direction as that of each [of the] other *yarn* [yarns], gathering such threads into generally parallel relationship at a point beyond the balloon in each, the location of gathering of the threads being substantially the same distance from the outer end of each balloon, forwarding such threads in such generally parallel relationship, forming a loop under yielding tension in such forwarded threads, feeding the threads together from the loop, twisting the thus fed gathered threads together to form a cord, during the last named twisting step forming a balloon in the cord, withdrawing the twisted cord from the last named balloon, and yieldingly coiling such cord, the first twisting, the gathering, the looping, and the second twisting steps being performed with the material continuously in motion.

10. An apparatus for forming stranded cord from a plurality of yarns in one continuous operation comprising a plurality of similar yarn twisting spindles, the spindles being of the type which delivers the twisted thread therefrom in a balloon, means incorporated in each twisting spindle for imposing a predetermined back tension on the yarn, the axes of the spindles being generally parallel, each such spindle twisting a yarn into a twisted thread as the yarn passes therethrough, means for gathering and forwarding such threads in generally parallel relationship, said last named means being located at the delivery ends of the spindles and substantially equally spaced from each spindle, means receiving the threads from the gathering and forwarding means for twisting together the gathered threads to form a cord, the material traveling continuously from the sources of supply of the yarn to the last named means, and [looper] *tension compensating* means [interposed] *acting on the gathered threads passing toward* [between the gathering and forwarding means and] the last recited twisting means. [to store an excess length of gathered threads yieldingly under tension.]

11. An apparatus for forming stranded cord from a plurality of yarns in one continuous operation, comprising a plurality of similar twisting spindles, the spindles being of the type which delivers the twisted thread therefrom in a balloon, means incorporated in each twisting spindle for imposing a predetermined back tension on the yarn, the axes of each such balloon generally coinciding with the axis of its spindle, the axes of the twisting spindles being generally parallel, means for gathering and forwarding the threads from the twisting spindles, such last named being located beyond the outer end of each of the balloons from the twisting spindles and being spaced at substantially equal distances from the axes of the spindles, a cabling spindle for twisting together the thus forwarded threads to form a cord, the cabling spindle including a cord receiving bobbin, means for twisting the threads together before they are delivered to the bobbin, and means for driving the last named twisting means in synchronism with the twisting spindles, the material traveling continuously from the sources of supply of the yarn through the gathering and forwarding means and to the cabling spindle and [looper] *tension compensating* means [interposed] *acting on the gathered threads passing toward* [between the gathering and forwarding means and] the cabling spindle. [to store an excess length of gathered threads yieldingly under tension.]

12. An apparatus for forming stranded cord from a plurality of yarns in one continuous operation, comprising a plurality of similar twisting spindles each incorporating its source of yarn supply, the spindles being of the type which delivers the twisted thread therefrom in a balloon, means incorporated in each twisting spindle for imposing a predetermined back tension on the yarn, the axis of each such balloon generally coinciding with the axis of its spindle, the axes of the twisting spindles being generally parallel, means for gathering and forwarding the threads from the twisting spindles, such last named means being located beyond the outer end of each of the balloons from the twisting spindles and being spaced at substantially equal distances from the axes of the spindles, a cabling spindle of the type creating, and receiving material from, a balloon for twisting together the thus forwarded threads to form a cord, the cabling spindle including a driven rotary cord receiving bobbin, rotary means for receiving and twisting the threads together before they are delivered to the bobbin, and means for driving the last named rotary twisting means in synchronism with the twisting spindles, the material traveling continuously from the sources of supply of the yarn through the gathering and forwarding means and to the cabling spindle, and [looper] *tension compensating* means [interposed] *acting on the gathered threads passing toward* [between the gathering and forwarding means and] the cabling spindle. [to store an excess length of gathered threads yieldingly under tension.]

13. An apparatus for forming stranded cord from a plurality of yarns in one continuous operation, comprising a plurality of similar twisting spindles each incorporating its source of yarn supply, the spindles being of the type which delivers the twisted thread therefrom in a balloon, means incorporated in each twisting spindle for imposing a predetermined back tension on the yarn, the axis of each such balloon generally coinciding with the axis of its spindle, the axes of the twisting spindles being generally parallel, means for gathering and forwarding the threads from the twisting spindles, the last named means including a driven capstan having a step smoothly dished in axial section, thread from each twisting spindle being led under tension from its balloon substantially directly to and around the capstan step, such capstan being located beyond the outer end of each of the balloons from the twisting spindles and being spaced at substantially equal distances from the axes of the spindles, a cabling spindle of the type creating, and receiving material from, a balloon for twisting together the thus forwarded threads to form a cord, the cabling spindle including a driven rotary cord receiving bobbin, rotary means for receiving and twisting the threads together before they are delivered to the bobbin, and means for driving the last named rotary twisting means in synchronism with the twisting spindles, the material traveling continuously from the sources of supply of the yarn to the capstan and to the cabling spindle, and [looper] *tension compensating* means [interposed] *acting on the gathered threads passing toward* [between the capstan and] the cabling spindle. [to store an excess length of gathered threads yieldingly under tension.]

14. An apparatus for forming stranded cord from a plurality of yarns in one continuous operation, comprising a plurality of similar double-twist twisting spindles each incorporating its source of yarn supply, the spindles being of the type which delivers the twisted thread therefrom in a balloon, means incorporated in each twisting spindle for imposing a predetermined back tension on the yarn, the axis of each such balloon generally coinciding with the axis of its spindle, the axes of the twisting spindles being generally parallel, means for gathering and forwarding the threads from the twisting spindles, the last named means including a driven capstan having a step smoothly dished in axial section, thread from each twisting spindle being led under tension from its balloon substantially directly to and around the capstan step, such capstan being located beyond the outer end of each of the balloons from the twisting spindles and being spaced at substantially equal distances from the axes of the spindles, a double-twist cabling spindle of the type creating, and receiving material from, a balloon for twisting together the thus forwarded threads to form a cord, the cabling spindle including a driven rotary cord receiving bobbin, rotary means for receiving and twisting the threads together before they are delivered to the bobbin, and means for driving the last named rotary twisting means in synchronism with the twisting spindles, the material traveling continuously from the sources of supply of the yarn to the capstan and to the cabling spindle, and [looper] *tension compensating* means [interposed] *acting on the gathered threads passing toward* [between the capstan and] the cabling spindle. [to store an excess length of gathered threads yieldingly under tension.]

15. An apparatus for forming stranded cord from a plurality of yarns in one continuous operation, comprising a plurality of similar yarn twisting spindles each incorporating its source of yarn supply, the spindles being of the type which delivers the twisted thread therefrom in a balloon in free flight through the air, means incorporated in each twisting spindle for imposing a predetermined back tension on the yarn, the axis of each such balloon generally coinciding with the axis of its spindle, the axes of the twisting spindles being generally parallel, means for gathering and forwarding the threads from the twisting spindles, the last named means including a driven capstan, thread from each twisting spindle being led under tension from its balloon substantially directly to and around the capstan, such capstan being located beyond the outer end of each of the balloons from the twisting spindles, a cabling device of the type creating, and receiving material from, a balloon in free flight through the air for twisting together the thus forwarded threads to form a cord, said cabling device comprising a rotary driven spindle having a free end spaced from the capstan, a bobbin support mounted on the spindle of the cabling device, a driving connection between the spindle of the cabling device and the bobbin support, the capstan substantially positively forwarding the threads from the outer ends of their balloons, means for driving said capstan in synchronism with the spindle of the cabling device, and means to drive the yarn twisting spindles and the cabling spindle in synchronism.

16. An apparatus for forming stranded cord from a plurality of yarns in one continuous operation, comprising a plurality of similar yarn twisting spindles, each incorporating its source of yarn supply, the spindles being of the type which delivers the twisted thread therefrom in a balloon in free flight through the air, means incorporated in each twisting spindle for imposing a predetermined back tension on the yarn, the axis of each such balloon generally coinciding with the axis of its spindle, the axes of the twisting spindles being generally parallel, means for gathering and forwarding the threads from the twisting spindles, the last named means including a driven capstan, thread from each twisting spindle being led under tension from its balloon substantially directly to and around the capstan, such capstan being located beyond the outer end of each of the balloons from the twisting spindles and being spaced at substantially equal distances from the axes of the yarn twisting spindles, a cabling device of the type creating, and receiving material from, a balloon in free flight through the air for twisting together the thus forwarded threads to form a cord, said cabling device comprising a rotary driven spindle having a free end spaced from the capstan, the capstan lying at least generally on the projected axis of the spindle of the cabling device, a bobbin support mounted on the cabling device, a driving connection between the spindle of the cabling device and the bobbin support, the capstan substantially positively forwarding the threads from the outer ends of their balloons, means for driving said capstan in synchronism with the spindle of the cabling device, and means to drive the yarn twisting spindles and the cabling spindle in synchronism.

17. An apparatus for forming stranded cord from a plurality of yarns in one continuous operation, comprising a plurality of similar yarn twisting spindles each incorporating its source of yarn supply, the spindles being of the type which delivers the twisted thread therefrom in a balloon in free flight through the air, adjustable means incorporated in each twisting spindle for imposing a selected predetermined back tension on the yarn, the axis of each such balloon generally coinciding with the axis of its spindle, the axes of the twisting spindles being generally parallel, means for gathering and forwarding the threads from the twisting spindles, the last named means including a driven capstan, thread from each twisting spindle being led under tension from its balloon substantially directly to and around the capstan, such capstan being located beyond the outer end of each of the balloons from the twisting spindles and being spaced at substantially equal distances from the axes of the yarn twisting spindles, a cabling device of the type creating, and receiving material from, a balloon in free flight through the air for twisting together the thus forwarded threads to form a cord, said cabling device comprising a rotary driven spindle having a free end spaced from the capstan, the capstan lying at least generally on the projected axis of the spindle of the cabling device, a bobbin support mounted on the spindle of the cabling device, a slip driving connection between the spindle of the cabling device and the bobbin support, the capstan substantially positively forwarding the threads from the outer ends of their balloons, means drivingly connecting said capstan with the spindle of the cabling device, a change speed mechanism incorporated in said last named means, whereby the capstan is driven in synchronism with, and at a selected speed ratio with respect to, the spindle of the cabling device, and means to drive the yarn twisting spindles and the cabling spindle in synchronism.

18. The method of forming stranded cord from a plurality of yarns in one continuous operation comprising [the following steps in the order named:] feeding each of a plurality of yarns in the direction of its length from its separate source of supply, imposing a predetermined back tension on each yarn, during such feeding and after each yarn has left the location of imposition of the back tension thereon forming a balloon travelling in free flight through the air in each such yarn and separately twisting each of the yarns at the same rate to form a thread, the axes of the above named balloons extending generally parallel to each other, at a point beyond each of the above named balloons gathering the resulting threads into generally parallel relationship and controlling the speed of their withdrawal from their respective balloons by substantially positively pulling the threads at a rate synchronized with the rate of the twisting of the yarns, forwarding such threads in such generally parallel relationship, twisting the thus fed gathered threads together to form a cord, during the last named twisting step forming a balloon in free flight through the air in the cord, the twisting of the threads together to form a cord being carried out at a rate synchronized with the rate of twisting of the yarns to form threads, and withdrawing the cord from its balloon and coiling it, the twisting of the yarns, the gathering of the resulting threads, and the twisting of the threads together to form a cord being performed with the material continuously in motion.

19. The method of forming stranded cord from a plurality of yarns in one continuous operation comprising [the following steps in the order named:] feeding each of a plurality of yarns in the direction of its length from its separate source of supply, imposing a predetermined back tension on each such yarn, during such feeding and after each yarn has left the location of imposition of the back tension thereon forming a balloon travelling in free flight through the air in each such yarn and separately twisting each of the yarns at the same rate to form a thread, the axis of the above named balloons extending generally parallel to each other, at a point beyond each of the above named balloons gathering the resulting threads into generally parallel relationship and controlling the speed of their withdrawal from their respective balloons by substantially positively pulling the threads at a rate synchronized with the rate of the twisting of the yarns, the location of the gathering and pulling of the threads being substantially the same distance from the outer end of each of the above named balloons, forwarding such threads in such generally parallel relationship, twisting the thus fed gathered threads together to form a cord, during the last named twisting step forming a balloon in free flight through the air in the cord, the twisting of the threads together to form a cord being carried out at a rate synchronized with the rate of twisting of the yarns to form threads, and withdrawing the cord from its balloon and yieldingly coiling it, the twisting of the yarns, the gathering of the resulting threads, and the twisting of the threads together to form a cord being performed with the material continuously in motion.

*20. The method of producing twisted elongated filamentary material which comprises continuously two-for-one twisting elongated filamentary material extending from a supply thereof on and along a fixed axis and thence into a free loop by spinning such loop about such axis and around the supply source as a first flying balloon, one of said twists taking place in the first flying balloon, extending twisted material from said loop into another free loop and thence on and along a fixed axis separate from the supply axis into a take-up portion, continuously two-for-one twisting the extended twisted material by spinning the loop thereof about the latter axis and around said take-up portion as a second flying balloon having an orbit isolated from that of the supply balloon and which exerts a centrifugal pull on such twisted material opposite to the centrifugal pull thereon of the supply balloon, one of the twists in the second two-for-one twisting operation taking place in the second flying balloon, and continuously drawing in the take-up portion within the orbit of the second balloon to maintain continuous longitudinal travel of the material from the supply source through the balloons while multiple twisting the material.*

*21. The method of producing twisted elongated filamentary material which comprises continuously two-for-one twisting elongated filamentary material extending from a supply thereof on and along a fixed axis and thence into a free loop by spinning such loop about such axis and around the supply source as a first flying balloon and applying to the supply a back tension counteracting the centrifugal pull of said balloon, one of said twists taking place in the first flying balloon, extending twisted material from said loop into another free loop and thence on and along a fixed axis separate from the supply axis into a take-up portion, continuously two-for-one twisting the extended twisted material by spinning the loop thereof about the latter axis and around said take-up portion as a second flying balloon having an orbit isolated from that of the supply balloon and which exerts a centrifugal pull on such twisted material opposite to the centrifugal pull thereon of the supply balloon, one of the twists in the second two-for-one twisting operation taking place in the second flying balloon, and continuously drawing in the take-up portion within the orbit of the second balloon to maintain continuous longitudinal travel of the material from the supply source through the balloons while multiple twisting the material.*

*22. The method of producing twisted elongated filamentary material which comprises continuously two-for-one twisting elongated filamentary material extending from a supply thereof on and along a fixed axis and thence into a free loop by spinning such loop about such axis and around the supply source as a first flying balloon, one of said twists taking place in the first flying balloon, extending twisted material from said loop into another free loop and thence on and along a fixed axis separate from the supply axis into a take-up portion, continuously two-for-one twisting the extended twisted material by spinning the loop thereof about the latter axis and around said take-up portion as a flying second balloon having an orbit isolated from that of the supply balloon and which exerts a centrifugal pull on such twisted material opposite to the centrifugal pull thereon of the first supply balloon, continuously drawing in the take-up portion within the orbit of the second balloon to maintain continuous longitudinal travel of the material from the supply source through the balloons while multiple twisting the material, one of the twists in the second two-for-one twisting operation taking place in the second flying balloon, and applying a yielding tension to the material extending between said loops to compensate for a difference in the pulls of the opposing balloons.*

*23. The method of producing twisted elongated filamentary material which comprises continuously two-for-one twisting separate strands of such material respectively extending from separate supplies thereof on and along separate fixed axes and thence into free loops by spinning such loops about their respective supplies and supply axes as separate first flying supply balloons, extending twisted strands from said loops in gathered relation into another free loop and thence on and along a fixed axis separate from the supply axis into a take-up portion, continuously two-for-one twisting the gathered strands by spinning the loop thereof about the latter axis and around said take-up portion as a second flying balloon having an orbit isolated from those of the supply balloons and which exerts centrifugally a pull on the gathered strands opposing the centrifugal pulls thereon of the supply balloons, one of the twists in the second two-for-one twisting operation taking place in the second flying balloon, and continuously drawing in the take-up portion within the orbit of the second balloon to maintain continuous longitudinal travel of the material from the supply sources through the first and second balloons while multiple twisting the material.*

*24. The method of producing twisted elongated filamentary material which comprises continuously two-for-one twisting separate strands of such material respectively extending from separate supplies thereof on and along separate fixed axes and thence into free loops by spinning such loops about their respective supplies and supply axes as separate, first, flying supply balloons and*

*applying to each strand a back tension counteracting the centrifugal pull of the balloon formed therefrom, extending twisted strands from said loops in gathered relation into another free loop and thence on and along a fixed axis separate from the supply axis into a take-up portion, continuously two-for-one twisting the gathered strands by spinning the loop thereof about the latter axis and around said take-up portion as a second flying balloon having an orbit isolated from those of the supply balloons and which exerts centrifugally a pull on the gathered strands opposing the centrifugal pulls thereon of the supply balloons, one of the twists in the second two-for-one twisting operation taking place in the second flying balloon, and continuously drawing in the take-up portion within the orbit of the second balloon to maintain continuous longitudinal travel of the material from the supply sources through the first and second balloons while multiple twisting the material.*

*25. The method of producing twisted elongated filamentary material which comprises continuously two-for-one twisting separate strands of such material respectively extending from separate supplies thereof on and along separate fixed axes and thence into free loops by spinning such loops about their respective supplies and supply axes as separate, first, flying supply balloons, extending twisted strands from said loops in gathered relation into another free loop and thence on and along a fixed axis separate from the supply axis into a take-up portion, continuously two-for-one twisting the gathered strands by spinning the loop thereof about the latter axis and around said take-up portion as a second flying balloon having an orbit isolated from those of the supply balloons and which exerts centrifugally a pull on the gathered strands opposing the centrifugal pulls thereon of the supply balloons, one of the twists in the second two-for-one twisting operation taking place in the second flying balloon, continuously drawing in the take-up portion within the orbit of the second balloon to maintain continuous longitudinal travel of the material from the supply sources through the first and second balloons while multiple twisting the material, and applying a yielding tension to the gathered strands between the supply loops and the last mentioned loop to compensate for a difference in the pulls of the opposing balloons.*

*26. The method of forming stranded cord from a plurality of elongated flexible filamentary materials such as yarns in one continuous operation comprising feeding each of a plurality of such materials in the direction of its length, imposing a predetermined back tension on each such material, in the first portion of the travel of each such material, beyond the location of imposition of the back tension thereon and in said first portion of travel two-for-one twisting the material by the following steps: in a first pass of such material in said first portion imparting a first twist to the material, in a second, reverse, pass of such material in said first portion of travel forming a balloon travelling in free flight through the air thereby to impart the second twist to the material, gathering the resulting threads issuing from the outer termini of said balloons into generally parallel relationship, feeding the thus gathered threads into a second portion of travel, in such second portion of travel two-for-one twisting the threads about each other by the following steps: in a first pass of such gathered threads forming a balloon travelling in free flight through the air thereby to impart a first twist to such gathered threads, in a second, reverse, pass of such gathered threads in said second portion of travel imparting a second twist to the gathered threads, pulling the resulting cord from said second portion of the travel of the material, and coiling the cord, the twisting of the materials in said first portion of travel and the twisting of the gathered threads and resulting cord in the second portion of travel being performed with the materials continuously in motion, and applying a compensating tension to the gathered threads between the balloons in the first and second portions of the travel of the materials to maintain such balloons under control.*

*27. Apparatus for twisting elongated flexible filamentary material such as yarn in one continuous operation comprising a two-for-one material supply containing twisting spindle of the type which forms filamentary material extending therefrom into a free-flying balloon of substantially constant height, one of the twists taking place in such balloon, means associated with said spindle for imposing a predetermined back tension on such material between the material supply and the balloon a separate two-for-one twisting device of the type forming and receiving filamentary material from a free-flying balloon, of substantially constant height, one of the twists at said device being effected in said last named balloon, said device including means for drawing in twisted material from the latter balloon within the orbit thereof means for leading the twisted material from the first mentioned balloon continuously into the last mentioned balloon to form the latter, and means for driving said twisting spindle and said twisting device in synchronism.*

*28. Apparatus for twisting elongated flexible filamentary material such as yarn in one continuous operation comprising a two-for-one twisting spindle of the type which forms filamentary material extending therefrom into a free-flying balloon, one of the twists taking place in such balloon, means associated with said spindle for imposing a predetermined back tension on such material, a two-for-one twisting device of the type forming and receiving filamentary material from a free-flying balloon, one of the twists at said device being effected in said last named balloon, said device including means for drawing in twisted material from the latter balloon, means for leading the twisted material from the first mentioned balloon continuously into the last mentioned balloon to form the latter, tension compensating means acting upon the material between said balloons, and means for driving said twisting spindle and said twisting device in synchronism.*

*29. Apparatus for twisting elongated flexible filamentary material such as yarn in one continuous operation comprising a plurality of two-for-one material supply containing twisting spindles each of the type which forms filamentary material extending therefrom into a free-flying balloon of substantially constant height, one of the twists taking place in such balloon, means associated with each spindle for imposing a predetermined back tension on such material between the material supply and the balloon, a separate two-for-one twisting device of the type forming and receiving filamentary material from a free-flying balloon of substantially constant height, one of the twists at said device being*

*effected in said last named balloon, said device including means for drawing in twisted material from the latter balloon within the orbit thereof, means for gathering together the twisted materials from the balloons formed by said spindles and leading such materials in gathered relation into the last mentioned balloon to form the latter, and means for driving said twisting spindles and said twisting device in synchronism.*

*30. Apparatus for twisting elongated flexible filamentary material such as yarn in one continuous operation comprising a plurality of two-for-one twisting spindles each of the type which forms filamentary material extending therefrom into a free-flying balloon, one of the twists taking place in such balloon, means associated with each spindle for imposing a predetermined back tension on such material, a two-for-one twisting device of the type forming and receiving filamentary material from a free-flying balloon, one of the twists at said device being effected in said last named balloon, said device including means for drawing in twisted material from the latter balloon, means for gathering together the twisted materials from the balloons formed by said spindles and leading such material in gathered relation continuously into the last mentioned balloon to form the latter, the last mentioned means acting to compensate the opposing tensions of said balloons, and means for driving said twisting spindles and said twisting device in synchronism.*

*31. An apparatus for forming stranded cord from a plurality of elongated flexible filamentary materials such as yarns in one continuous operation comprising a plurality of similar material twisting spindles, each such spindle being of the type which two-for-one twists the material passing therethrough and which effects the first twist in the material in a first pass in the spindle and which delivers the twisted thread therefrom in a balloon in free flight through the air, such balloon constituting a second, reverse, pass of the material at the twisting spindle, means in each such twisting spindle for imposing a predetermined back tension on the material therein at the entering end of the first pass of the material in the twisting spindle, means beyond the outer end of the balloon of each such twisting spindle for receiving and guiding the threads issuing from said balloons, a two-for-one cabling and twisting device of the type creating and receiving material from a balloon in free flight through the air, such balloon constituting the first pass at the cabling and twisting device and effecting the first twist of the cord thereat, the second twist of the cord at such cabling and twisting device being effected in a second, reverse, pass of the cord through said cabling and twisting device, cord coiling means mounted on the cabling device and driven therefrom, the cord coiling means receiving cord from the exit end of said second pass in the cabling and twisting device, the threads being led from the receiving and guiding means into the balloon of the cabling and twisting device, the thread receiving and guiding means gathering the threads from the several twisting spindles into generally parallel relationship and applying tension to the thus gathered threads thereby to control the balloons of the twisting spindles and the balloon of the cabling and twisting device, and means to drive the twisting spindles and the cabling and twisting device in synchronism.*

*32. The method of producing twisted elongated filamentary material which comprises continuously two-for-one twisting separate strands of such material respectively extending from separate supplies thereof into free loops while spinning such loops about their respective supply sources as separate flying supply balloons, extending twisted strands from said loops in gathered relation into another free loop and thence into a take-up portion, continuously two-for-one twisting the gathered strands while spinning the loop thereof about said take-up portion as a flying balloon which exerts centrifugally a pull on the gathered strands opposing the centrifugal pulls thereon of the supply balloons, said last named balloon under yielding tension, applying to the gathered strands tension maintaining the opposing balloon pulls in substantially counterbalanced relation, and continuously drawing in the take-up portion to maintain continuous longitudinal travel of the material from the supply sources through the balloons while multiple twisting the material.*

*33. The method of producing twisted elongated filamentary material which comprises continuously feeding such material in the direction of its length, imposing a predetermined back tension on such material, in the first portion of travel of such material, beyond the location of imposition of the back tension thereon and in said first portion of travel two-for-one twisting the material by the following steps: in a first pass of such material in said first portion imparting a first twist to the material, in a second, reverse, pass of such material in said first portion of travel forming a balloon traveling in free flight through the air thereby to impart the second twist to the material, feeding the thus twisted material into a second portion of travel, in such second portion of travel two-for-one twisting such material by the following steps: in a first pass of such material forming a balloon traveling in free flight through the air thereby to impart a first twist in such second portion of travel, in a second, reverse, pass of such material in said second portion of travel imparting a second twist to the material, pulling the resulting twisted material from said second portion of the travel of the material, and coiling the resulting twisted material, the twisting of the material in said first portion of travel and the twisting of the material in the second portion of travel being performed with the material continuously in motion, and applying a compensating tension to the material between the balloons in the first and second portions of the travel of the material to maintain such balloons under control.*

*34. Apparatus for twisting elongated flexible filamentary material such as yarn in one continuous operation comprising a plurality of two-for-one twisting spindles each of the type which forms filamentary material extending therefrom into a free-flying first balloon, means associated with each spindle for imposing a predetermined back tension on such material, a two-for-one twisting device of the type forming and receiving filamentary material from a second free-flying balloon, said device including means for drawing in twisted material from the latter balloon, means for gathering together the twisted materials from the first balloons, for leading such materials in gathered relation into the second balloon to form the latter and for maintaining said second balloon under yielding tension, including means acting to counteract a difference between the tension of materials entering the second balloon and the sum of the tensions of*

*materials leaving the first balloons, and means for driving said twisting spindles and said twisting device in synchronism.*

*35. An apparatus for forming stranded cord from a plurality of elongated flexible filamentary materials such as yarns in one continuous operation comprising a plurality of similar material twisting spindles, each such spindle being of the type which two-for-one twists the material passing therethrough and which effects the first twist in the material in a first pass in the spindle and which delivers the twisted thread therefrom in a balloon in free flight through the air, such balloon constituting a second, reverse, pass of the material at the twisting spindle, means in each such twisting spindle for imposing a predetermined back tension on the material therein at the entering end of the first pass of the material in the twisting spindle, a two-for-one cabling and twisting device of the type creating and receiving material from a balloon in free flight through the air, such last named balloon constituting the first pass at the cabling and twisting device and effecting the first twist of the cord thereat, the second twist of the cord in such cabling and twisting device being effected in a second, reverse, pass of the cord through said cabling and twisting device, cord coiling means mounted on the cabling device and driven therefrom, the cord coiling means receiving cord from the exit end of said second pass in the cabling and twisting device, the threads being led from the balloons of the twisting spindles into the balloon of the cabling and twisting device, means beyond the outer end of the balloon of each such twisting spindle for receiving and guiding the threads issuing from said balloon, for gathering the threads from the several twisting spindles into generally parallel relationship, and for applying compensating tension to the threads issuing from the balloons of each such twisting spindles, thereby to control the balloons of the twisting spindles and the balloon of the cabling and twisting device, and means to drive the twisting spindles and the cabling and twisting device in synchronism.*

*36. An apparatus for twisting elongated flexible filamentary material such as yarn in one continuous operation comprising a material supply twisting spindle, such spindle being of the type which two-for-one twists the material passing therethrough and which effects the first twist of the material in a first pass in the spindle and delivers the twisted material therefrom in a balloon in free flight through the air, such balloon constituting a second, reverse, pass of the material at the twisting spindle, means in such twisting spindle for imposing a predetermined back tension on the material therein at the entering end of the first pass of the material in the twisting spindle, a two-for-one cabling and twisting device of the type creating and receiving elongated flexible material from a balloon in free flight through the air, such last named balloon constituting the first pass at the cabling and twisting device and effecting a first twist of the material thereat, a second twist of such material being effected in a second, reverse, pass of the material through said cabling and twisting device, material coiling means mounted on said device and driven therefrom, the material coiling means receiving material from the exit end of said second pass in the cabling and twisting device, means between the outer ends of the respective balloons of the twisting spindle and the cabling and twisting device, for leading twisted material from the balloon of the former into the balloon of the latter and for applying compensating tension to the material between these balloons to control the balloons, and means to drive the twisting spindle and the cabling and twisting device in synchronism.*

*37. An apparatus for forming stranded cord from a plurality of yarns in one continuous operation comprising a plurality of similar yarn twisting spindles, the spindles being of the type which delivers the twisted thread therefrom in a free flying balloon, means incorporated in each twisting spindle for imposing a predetermined back tension on the yarn, each such spindle twisting a yarn into a twisted thread as the yarn passes therethrough, means for gathering and forwarding the twisted threads in generally parallel relationship, means for receiving the threads from the gathering and forwarding means and twisting them together in a free flying balloon to form a cord, the material travelling continuously from the sources of supply of the yarn to the last named twisting means, and tension compensating means acting on the gathered threads passing between the point of gathering and the balloon of the last named twisting means.*

*38. Apparatus for twisting elongated filamentary flexible material such as yarn in one continuous operation comprising a plurality of two-for-one twisting spindles each of the type which forms filamentary material extending therefrom into a free-flying first balloon, means associated with each spindle for imposing a predetermined back tension on such material, a two-for-one twisting device of the type forming and receiving filamentary material from a second free-flying balloon, said device including means for drawing in twisted material from the latter balloon, means for gathering together the twisted materials from the first balloons and leading such materials in gathered relation into the second balloon to form the latter, said last named means including a rotatable gathering pulley and means for controlling its rotation so as to apply to such materials a tension compensating a difference between the tension of materials entering the second balloon and the sum of the tensions of materials leaving the first balloons, and means for driving said twisting spindle, said twisting device, and said gathering pulley in synchronism.*

*39. Apparatus for twisting elongated flexible filamentary material such as yarn in one continuous operation comprising a two-for-one twisting spindle having relatively stationary means for holding a supply of the material, a flyer to receive material from the supply and an eye coaxial with the flyer at a substantially constant spacing therefrom to receive a free portion of the material extending from the flyer to the eye, the spinning of the spindle forming such free portion into a free-flying balloon and producing a twist therein per spindle revolution, means associated with said spindle for imposing a predetermined back tension on each material between the material supply and the balloon, a separate two-for-one twisting device having a flyer and an eye coaxial with this flyer at a substantially constant spacing therefrom, means for leading twisted material from the first mentioned eye to the last mentioned eye, the material then extending from the latter in a free stretch to the flyer of said device and thence into a take-up portion, the spinning of said device forming said free stretch into a free-flying balloon having an orbit isolated from*

*that of the first mentioned balloon and producing a twist therein per revolution of said device, said device including means for drawing in said take-up portion within said orbit, and means for driving said spindle and said device in synchronism.*

*40. Apparatus for twisting elongated flexible filamentary material such as yarn in one continuous operation comprising a plurality of two-for-one twisting spindles each having relatively stationary means for holding a supply of the material, a flyer to receive material from the supply and an eye coaxial with the flyer at a substantially constant spacing therefrom to receive a free portion of the material extending from the flyer to the eye, the spinning of each such spindle forming the corresponding free portion into a free-flying balloon and producing a twist therein per spindle revolution, means associated with each such spindle for imposing a predetermined back tension on such material between the material supply and the balloon, a separate two-for-one twisting device having a flyer and an eye coaxial with this flyer at a substantially constant spacing therefrom, means for gathering together the twisted materials from the first mentioned eyes and leading such materials in gathered relation to the last mentioned eye, the material then extending from the latter in a free stretch to the flyer of said device and thence into a take-up portion, the spinning of said device forming said free stretch into a free flying balloon having an orbit isolated from the orbits of the first mentioned balloons and producing a twist therein per revolution of said device, said device including means for drawing in said take-up portion within said orbit, and means for driving said spindles and said device in synchronism.*

*41. An apparatus for forming stranded cord from a plurality of elongated flexible filamentary naterials such as yarns in one continuous operation comprising a plurality of similar material twisting spindles, each such spindle being of the type which two-for-one twists the material passing therethrough and which effects the first twist in the material in a first pass in the spindle and which delivers the twisted thread therefrom in a balloon in free flight through the air, such balloons constituting a second, reverse, pass of the material at the twisting spindle, means in each such twisting spindle for imposing a predetermined back tension on the material therein at the entering end of the first pass of the material in the twisting spindle, means beyond the outer end of the balloon of each such twisting spindle for receiving and guiding the threads issuing from said balloons, a two-for-one cabling and twisting device of the type creating and receiving material from a balloon in free flight through the air, such balloon constituting the first pass at the cabling and twisting device and effecting the first twist*

*of the cord thereat, the second twist of the cord at such cabling and twisting device being effected in a second, reverse, pass of the cord through said cabling and twisting device, cord coiling means mounted on the cabling device and driven therefrom within the orbit of its balloon, the cord coiling means receiving cord from the exit end of said second pass in the cabling and twisting device, the threads being led from the receiving and guiding means into the balloon of the cabling and twisting device, the thread receiving and guiding means gathering the threads from the several twisting spindles into generally parallel relationship, and means to drive the twisting spindles and the cabling and twisting device in synchronism.*

HENRY C. UHLIG.

REFERENCES CITED

The following references are of record in the file of this patent or the original patent:

UNITED STATES PATENTS

| Number | Name | Date |
|---|---|---|
| Re. 23,281 | Giffin | Oct. 10, 1950 |
| 359,409 | Stone | Mar. 15, 1887 |
| 398,270 | Lukens | Feb. 19, 1889 |
| 693,887 | Norman | Feb. 25, 1902 |
| 1,447,033 | Osborne | Feb. 27, 1923 |
| 1,579,923 | Gibson | Apr. 6, 1926 |
| 1,625,432 | Sager | Apr. 19, 1927 |
| 1,858,205 | Ferier | May 10, 1932 |
| 1,900,310 | Somerville | Mar. 7, 1933 |
| 1,907,530 | Ferier | May 9, 1933 |
| 1,949,621 | Pool | Mar. 6, 1934 |
| 1,983,413 | Spagnolo | Dec. 4, 1934 |
| 1,997,689 | Junghanns | Apr. 16, 1935 |
| 2,053,645 | Weaver | Sept. 6, 1936 |
| 2,080,918 | Honig | May 18, 1937 |
| 2,115,268 | Klein | Apr. 26, 1938 |
| 2,127,606 | Lea | Aug. 23, 1938 |
| 2,130,121 | Dunleavy | Sept. 13, 1938 |
| 2,173,762 | Morton | Sept. 19, 1939 |
| 2,240,153 | Carter et al. | Aug. 29, 1941 |
| 2,298,345 | Childs | Oct. 13, 1942 |
| 2,319,827 | Reardon | May 25, 1943 |
| 2,364,808 | Nelson | Dec. 12, 1944 |
| 2,364,984 | Larsen et al. | Dec. 12, 1944 |
| 2,377,784 | Hudson | June 5, 1945 |
| 2,379,806 | Kent | July 3, 1945 |
| 2,391,307 | Gwaltney et al. | Dec. 18, 1945 |
| 2,397,153 | Nauman | Mar. 26, 1946 |
| 2,400,323 | Winslow | May 14, 1946 |
| 2,410,674 | Nelson | Nov. 5, 1946 |
| 2,411,126 | Burnham | Nov. 12, 1946 |

FOREIGN PATENTS

| Number | Country | Date |
|---|---|---|
| 357,606 | Great Britain | Sept. 26, 1931 |
| 404,168 | Great Britain | Jan. 11, 1934 |

Certificate of Correction

Reissue No. 23,509 May 27, 1952

HENRY C. UHLIG

It is hereby certified that error appears in the printed specification of the above numbered patent requiring correction as follows:

Column 5, line 17, for "portions" read portion ; line 75, for "paws" read jaws ; column 6, line 37, for "ballons" read balloons ; column 10, line 75, for "bolloon" read balloon ; column 16, line 5, after "threads", second occurrence, strike out "*by whirling a free loop of each yarn about its source in a separate orbit*" and insert the same after "threads", first occurrence, and before the comma, same line; column 30, line 65, for "*each*" read *such*;

and that the said Letters Patent should be read as corrected above, so that the same may conform to the record of the case in the Patent Office.

Signed and sealed this 26th day of August, A. D. 1952.

[SEAL]

THOMAS F. MURPHY,
*Assistant Commissioner of Patents.*